US012344001B2

(12) United States Patent
Nakata et al.

(10) Patent No.: US 12,344,001 B2
(45) Date of Patent: *Jul. 1, 2025

(54) DRAINAGE CONTAINER AND RECORDING APPARATUS

(71) Applicant: SEIKO EPSON CORPORATION, Tokyo (JP)

(72) Inventors: Satoshi Nakata, Matsumoto (JP); Masahito Tatsumi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/641,964

(22) Filed: Apr. 22, 2024

(65) Prior Publication Data

US 2024/0269986 A1 Aug. 15, 2024

Related U.S. Application Data

(63) Continuation of application No. 17/820,507, filed on Aug. 17, 2022, now Pat. No. 11,981,146.

(30) Foreign Application Priority Data

Aug. 17, 2021 (JP) ................................ 2021-132600

(51) Int. Cl.
*B41J 2/175* (2006.01)
*B41J 2/165* (2006.01)
(Continued)

(52) U.S. Cl.
CPC ....... *B41J 2/17553* (2013.01); *B41J 2/16508* (2013.01); *B41J 2/16523* (2013.01); *B41J 2/1721* (2013.01); *B41J 2/185* (2013.01)

(58) Field of Classification Search
CPC .. B41J 2/16508; B41J 2/16523; B41J 2/1721; B41J 2/17509; B41J 2/17553;
(Continued)

(56) References Cited

U.S. PATENT DOCUMENTS 7,726,773 B2 * 6/2010 Nakamura ............. B41J 2/1721 347/30
7,976,121 B2 7/2011 Harada
(Continued)

FOREIGN PATENT DOCUMENTS

JP H05-270005 10/1993
JP 2004-195857 A 7/2004
JP 2016-199012 A 12/2016

*Primary Examiner* — Anh T Vo
(74) *Attorney, Agent, or Firm* — WORKMAN NYDEGGER

(57) ABSTRACT

A drainage container configured to be attached and detached in an attachment/detachment direction to and from an apparatus including a discharge portion to discharge drainage and configured to store the drainage discharged from the discharge portion, includes: a housing that stores the drainage and includes an opening formed in an upper surface of the housing; an accepting portion that accepts the drainage discharged from the discharge portion; and a lid portion configured to open and close the opening, in which the lid portion takes on an open state to open the opening when the drainage container is attached to the apparatus, and the lid portion takes on a closed state to close the opening when the drainage container is detached from the apparatus.

20 Claims, 31 Drawing Sheets

(51) Int. Cl.
*B41J 2/17* (2006.01)
*B41J 2/185* (2006.01)

(58) Field of Classification Search
CPC .... B41J 2/185; B41J 29/13; B41J 2002/1728; B41J 2002/1735; B41J 2002/1742; B41J 2002/1853
See application file for complete search history.

(56) References Cited

U.S. PATENT DOCUMENTS

| | | | | |
|---|---|---|---|---|
| 8,297,734 | B2 | 10/2012 | Harada | |
| 9,227,407 | B1 | 1/2016 | Harada | |
| 10,688,798 | B2 * | 6/2020 | Murata | B41J 2/16523 |
| 2009/0218271 | A1 * | 9/2009 | Harada | B41J 2/16523 210/236 |
| 2016/0303854 | A1 | 10/2016 | Matsuura et al. | |
| 2021/0016573 | A1 * | 1/2021 | Kimura | B41J 25/304 |

* cited by examiner

DRAINAGE CONTAINER AND RECORDING APPARATUS

The present application is a Continuation of U.S. application Ser. No. 17/820,507, filed Aug. 17, 2022, which is based on, and claims priority from, JP Application Serial Number 2021-132600, filed Aug. 17, 2021, the disclosures of which are hereby incorporated by reference herein in their entirety.

BACKGROUND

1. Technical Field

The present disclosure relates to a drainage container and a recording apparatus.

2. Related Art

As disclosed in JP-A-2016-199012, there has been known a waste liquid pack detachably provided to a printer and configured to store a waste liquid discharged from the printer.

The waste liquid pack includes a container, an opening communicating with the container, a sealing member that seals the opening, and a biasing member that biases the sealing member in a direction in which the opening is blocked. When the waste liquid pack is attached to the printer, a discharge port on the printer side thrusts the sealing member and breaks in the waste liquid pack. Thus, a waste liquid discharged from the printer is stored in the waste liquid pack. In the meantime, when the waste liquid pack is detached from the discharge port, the sealing member blocks the opening by use of biasing force. In this way, drainage is kept from leaking out of the waste liquid pack.

According to the above-described waste liquid pack, the inside of the container is in communication with the atmosphere when the waste liquid pack is attached to the printer, and it is therefore possible to anticipate evaporation of the stored waste liquid.

However, in the state where the waste liquid pack is attached to the printer, it is difficult to increase a gap around the opening in the attached state of the waste liquid pack in order to ensure the communication with the atmosphere when taking into account a possible leakage of the drainage from the opening. Accordingly, there is a problem of a limitation in the amount of evaporation of the waste liquid from the gap around the opening, which may lead to low evaporation efficiency of the waste liquid.

SUMMARY

A drainage container configured to be attached and detached in an attachment/detachment direction to and from an apparatus including a discharge portion to discharge drainage and configured to store the drainage discharged from the discharge portion, includes: a housing that stores the drainage and includes an opening formed in an upper surface of the housing; an accepting portion that accepts the drainage discharged from the discharge portion; and a lid portion configured to open and close the opening, in which the lid portion takes on an open state to open the opening when the drainage container is attached to the apparatus, and the lid portion takes on a closed state to close the opening when the drainage container is detached from the apparatus.

A recording apparatus includes an apparatus body, a recording head that performs recording by ejecting a liquid to a medium, a discharge portion that discharges drainage that comes into being inside the apparatus body, and the drainage container described above.

DESCRIPTION OF EXEMPLARY EMBODIMENTS

1. First Embodiment

A configuration of a recording apparatus 10 will be described to begin with. The recording apparatus 10 of this embodiment is a serial ink jet printer that performs recording by ejecting an ink as a liquid onto a medium P (such as paper).

Figure 1:
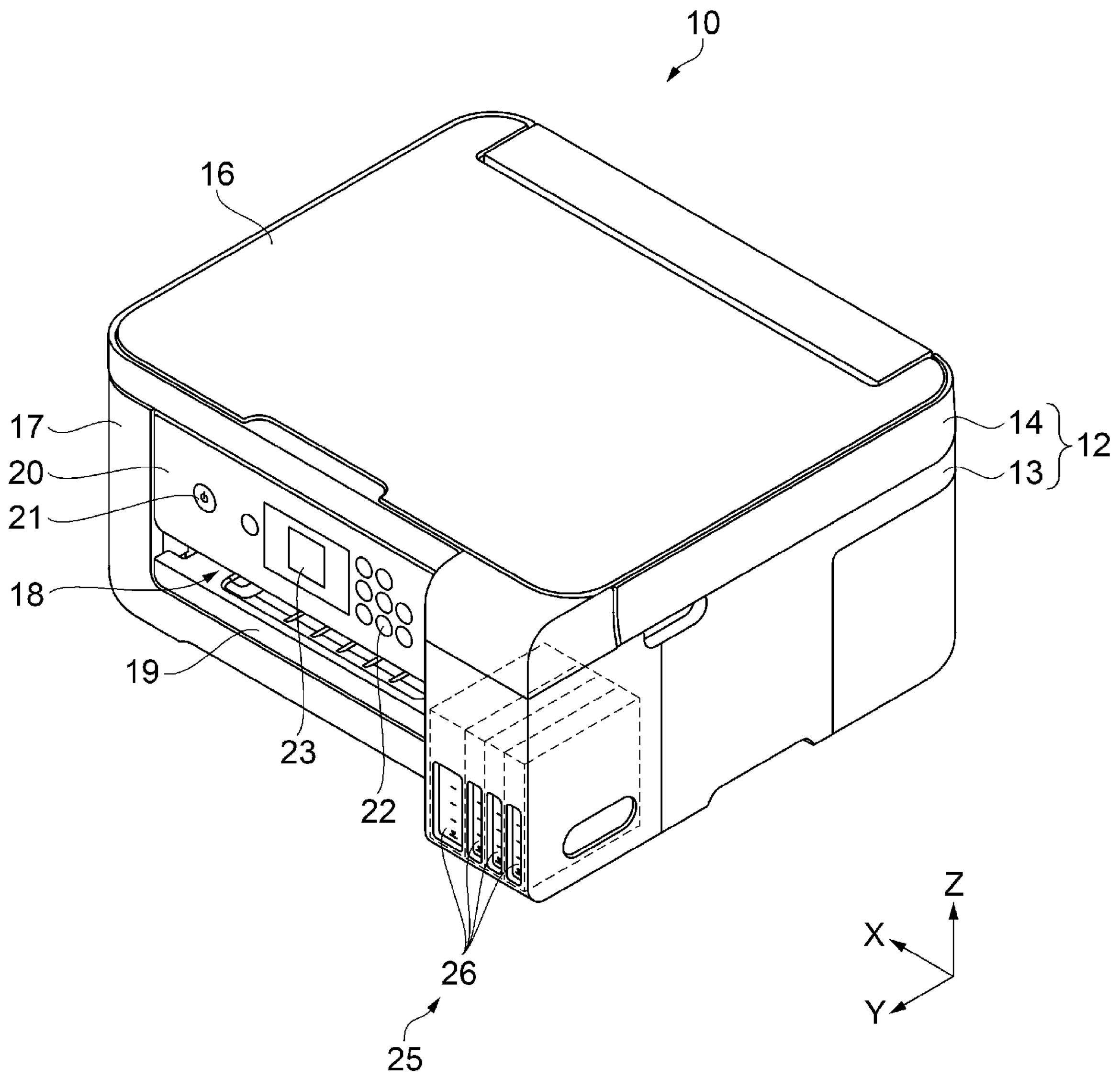
FIG. 1 is a perspective view showing a configuration of a recording apparatus according to a first embodiment.
Figure 2:
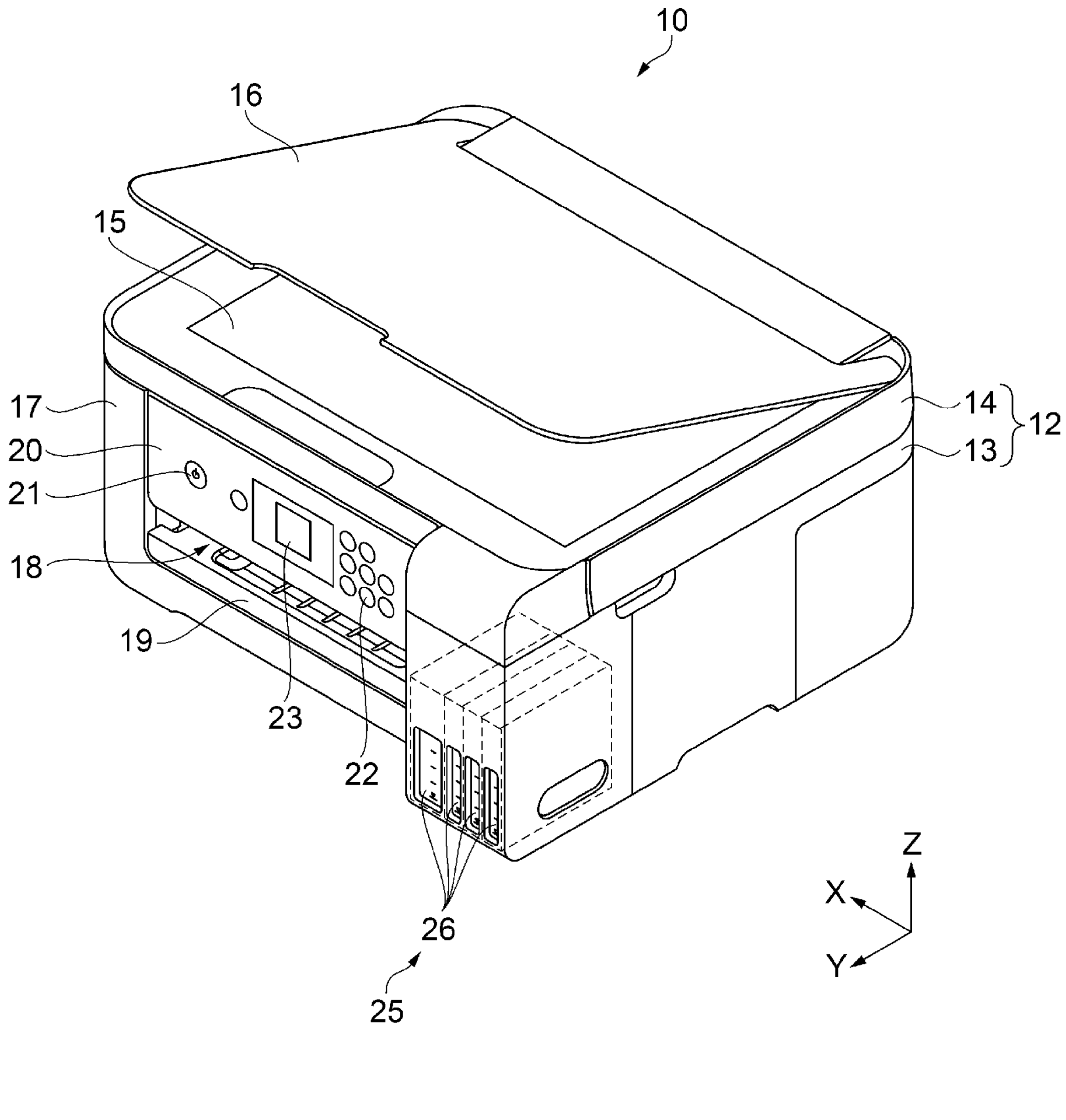
FIG. 2 is another perspective view showing the configuration of the recording apparatus according to the first embodiment.

FIGS. 1 and 2 are perspective views showing the configuration of the recording apparatus 10.

In a state where the recording apparatus 10 is installed on xy plane (a horizontal plane) that is parallel to x axis and y axis, a direction along z axis is an up-down direction. Specifically, +z direction is an upper direction and −z direction is a lower direction. A direction along the y axis is a front-rear direction. Specifically, +y direction side is a front direction (a front surface side) while −y direction side is a rear direction (a rear surface side). In the meantime, a direction along the x axis is a right-left direction (a width direction). Specifically, +x direction side is a leftward direction while −x direction side is a rightward direction.

As shown in FIGS. 1 and 2, the recording apparatus 10 includes an apparatus body 12. The apparatus body 12 includes a housing 13 having a substantially rectangular parallelepiped shape, and an original reading device 14 located at an upper portion of the housing 13. The original reading device 14 includes a horizontal original mounting surface 15 made of a transparent glass or the like to mount an original for reading, and an original cover 16 that can cover the original mounting surface 15. The original cover 16 is provided in such a way as to be openable and closable pivotally around a rotary shaft (not shown) that extends in the direction along the x axis in conformity to the width direction between a closed state (FIG. 1) to cover the original mounting surface 15 from above and an open state (FIG. 2) to open an upper region of the original mounting surface 15 by being opened from the closed state.

In an outer surface of the housing 13, a discharge port 18 for discharging the medium P from inside is provided at a lower portion of an anterior surface 17 serving as a front surface of the apparatus body 12. A stacker 19 is provided inside the discharge port 18 in order to support the media P in a stacked state, which are discharged forward from the inside of the housing 13.

An operating unit 20 to be operated by a user of the recording apparatus 10 is provided at an upper portion of the anterior surface 17 of the housing 13. The operating unit 20 is a horizontally long panel of which width direction along the x axis is defined as its longitudinal direction. The operating unit 20 is provided with a power button 21 to be operated to turn the recording apparatus 10 on and off, and operating buttons 22 to be operated when inputting a variety of operation information. The operating unit 20 is provided with a liquid crystal display module 23 that can display a state of operation of the recording apparatus 10 and so forth. The liquid crystal display module 23 may be a touch panel.

Figure 3:
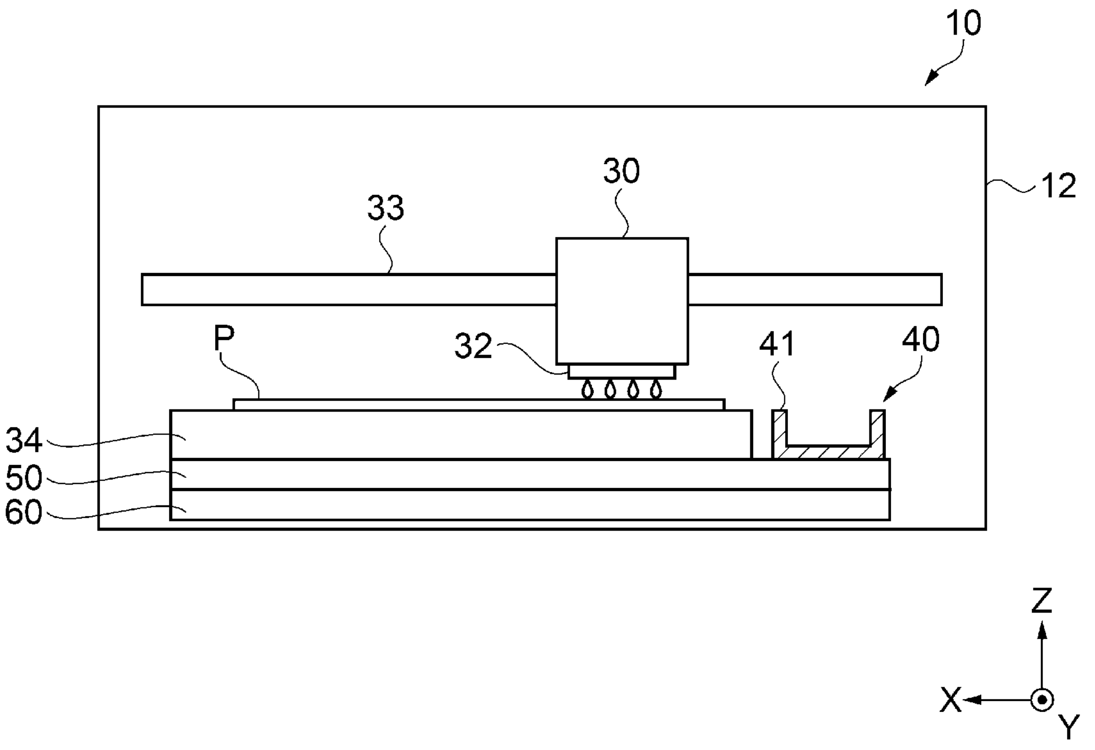
FIG. 3 is a schematic diagram showing an internal configuration of the recording apparatus according to the first embodiment.

An ink supply unit 25 is provided the anterior surface 17 of the housing 13. The ink supply unit 25 is configured to supply inks to a recording head 32 (FIG. 3). The ink supply unit 25 includes ink tanks 26 and the like. Each ink tank 26 is a container that can store an ink.

Next, an internal configuration of the recording apparatus 10 will be described.

As shown in FIG. 3, the recording apparatus 10 includes the recording head 32, and a carriage 30 that mounts the recording head 32.

The carriage 30 is supported by a guide rail 33 that extends in the direction along the x axis and is configured to be reciprocable in the direction along the x axis by a not-illustrated driving mechanism.

A platen 34 to support a transported medium P is disposed below the recording head 32. The platen 34 is formed into a plate shape. The recording head 32 includes multiple nozzles which eject inks in the form of droplets onto the medium P supported by the platen 34.

The recording apparatus 10 includes a transportation mechanism that transports the medium P from a not-illustrated paper feeding unit toward the discharge port 18 through the platen 34. Images, documents, and the like are recorded on the medium P as the recording apparatus 10 alternately carries out a recording operation to perform recording for one path by causing the recording head 32 to eject the droplets and a transporting operation to transport the medium P to the next recording position in the course of movement of the carriage 30 along the x axis.

In this embodiment, the recording apparatus 10 is of an off-carriage type in which the ink supply unit 25 and the ink tank 26 are arranged at different positions from the carriage 30. Instead, the recording apparatus 10 may be of an on-carriage type in which the ink supply unit 25 and the ink tank 26 are detachably mounted on the carriage 30. In the meantime, the recording apparatus 10 is not limited only to that of the serial type. The recording apparatus 10 may be of a line type in which the recording head 32 is designed as an elongated line head located across the entire maximum width of the medium P so as to be able to eject the droplets across the entire width of the medium P at a time.

The recording apparatus 10 further includes a maintenance unit 40. The maintenance unit 40 conducts maintenance in order to keep the recording head 32 in a normal state. For example, the maintenance unit 40 forcibly causes the recording head 32 to discharge the inks or air therefrom (a cleaning operation).

The maintenance unit 40 includes a cap 41. When the recording apparatus 10 is not carrying out the recording operation, the carriage 30 is located at a home position which is a position located away from a recording region in the recording operation.

The cap 41 is a member having a bottomed box shape, which is located at the home position. The cap 41 can move in a direction along the z axis by use of an elevating mechanism. The cap 41 is hoisted so as to be thrust against a lower surface side of the recording head 32. In this way, the cap 41 defines a closed space in such a way as to cover the nozzles formed at the lower surface of the recording head 32. This closed space can keep the inks inside the nozzles of the recording head 32 from drying out.

The cap 41 is coupled to a suction pump through a suction tube. The suction pump is driven in the closed space so as to suction the inks and the air inside the recording head 32 through the suction tube. Thus, the deteriorated inks (the inks which are dried and increased in viscosity) in the recording head 32 are suctioned, whereby the recording head 32 is kept in (recovers) the normal state.

In order to keep the recording head 32 in the normal state, the maintenance unit 40 forcibly causes the recording head 32 to eject the inks toward the cap 41, thus regularly carrying out a flushing operation to discharge the deteriorated inks in the recording head 32.

The ink (drainage) discharged from the recording head 32 as a consequence of the maintenance such as the cleaning operation and the flushing operation is treated as a waste liquid.

The waste liquid also comes into being at the time of so-called borderless printing. To be more precise, the ink (the drainage) ejected from the recording head 32 to the outside of an end portion of the medium P at the time of recording by the recording head 32 turns into the waste liquid.

The drainage that comes into being inside the apparatus body 12 as described above is collected by a drainage collection unit 50. Then, the drainage collected by the drainage collection unit 50 is discharged to a drainage container 60, and the discharged drainage is stored in the drainage container 60. The drainage that comes into being as a consequence of the cleaning operation and the flushing operation, or at the time of borderless printing is stored in the drainage container 60. Accordingly, it is possible to suppress contamination inside the apparatus body 12.

The recording apparatus 10 includes a control unit that controls respective driving units provided in the recording head 32, the maintenance unit 40, and the like. The control unit includes a CPU, a memory, a control circuit, an interface (I/F), and the like. The CPU is a central processing unit. The memory is a storage device that secures a region for storing programs or a workspace and the like for the CPU or the like. The memory includes a storage element such as a RAM and an EEPROM. When data for recording and the like are obtained from an external device such as an information processing terminal through the I/F, the CPU controls the respective driving units and the like.

Next, a configuration of the drainage collection unit 50 will be described.

Figure 4:
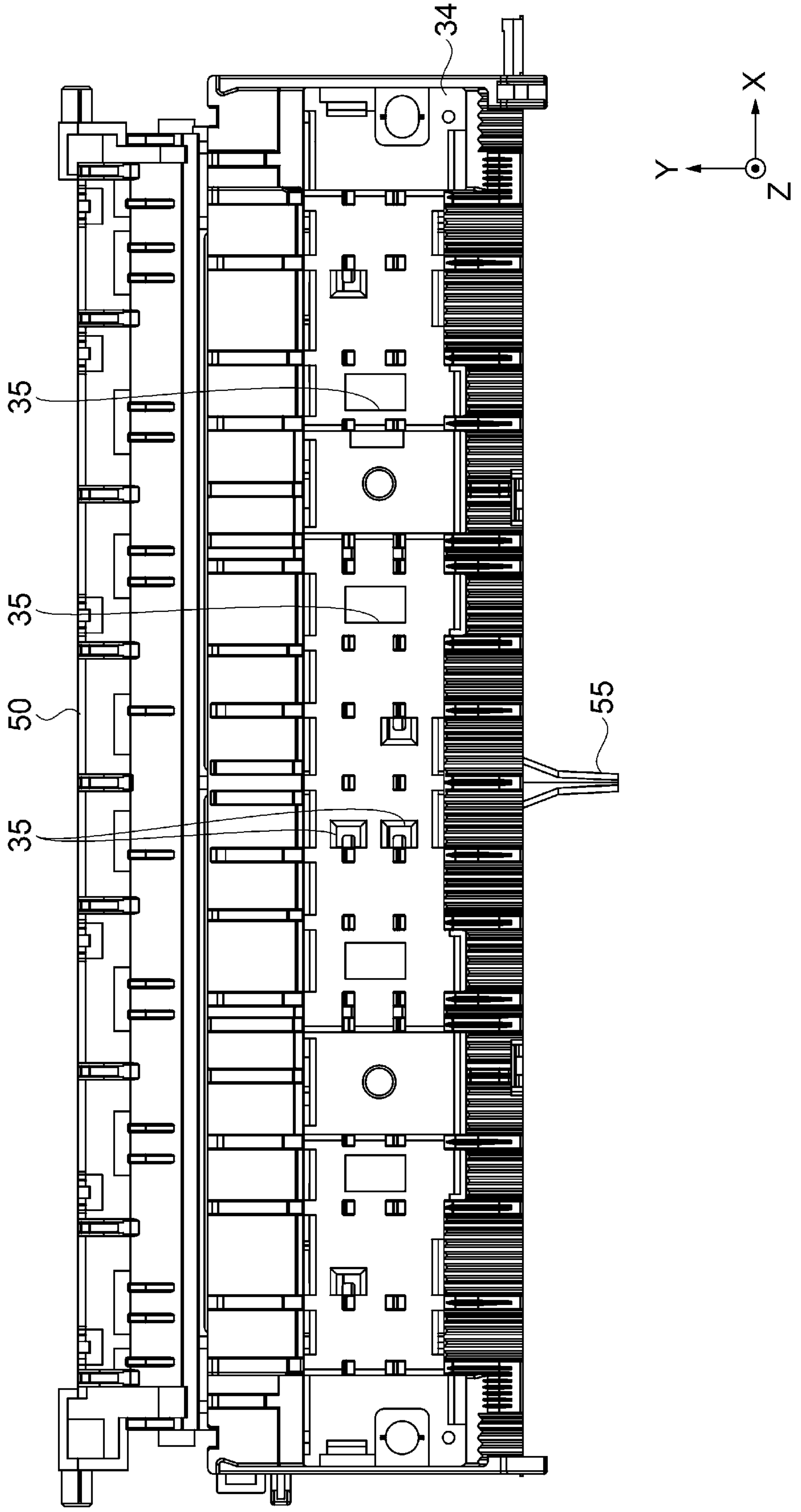
FIG. 4 is a plan view showing a configuration of a drainage collection unit according to the first embodiment.

As shown in FIG. 4, the drainage collection unit 50 is disposed below the platen 34. The drainage collection unit 50 takes on a plate shape, and has a sufficient size for supporting the entire platen 34. The platen 34 is provided with multiple through holes 35. The through holes 35 are holes that penetrate the platen 34 in the up-down direction and are designed to cause the drainage (the waste liquid) discarded to the outside of the end portion of the medium P at the time of the borderless printing to flow out to the drainage collection unit 50 disposed therebelow.

Figure 5:
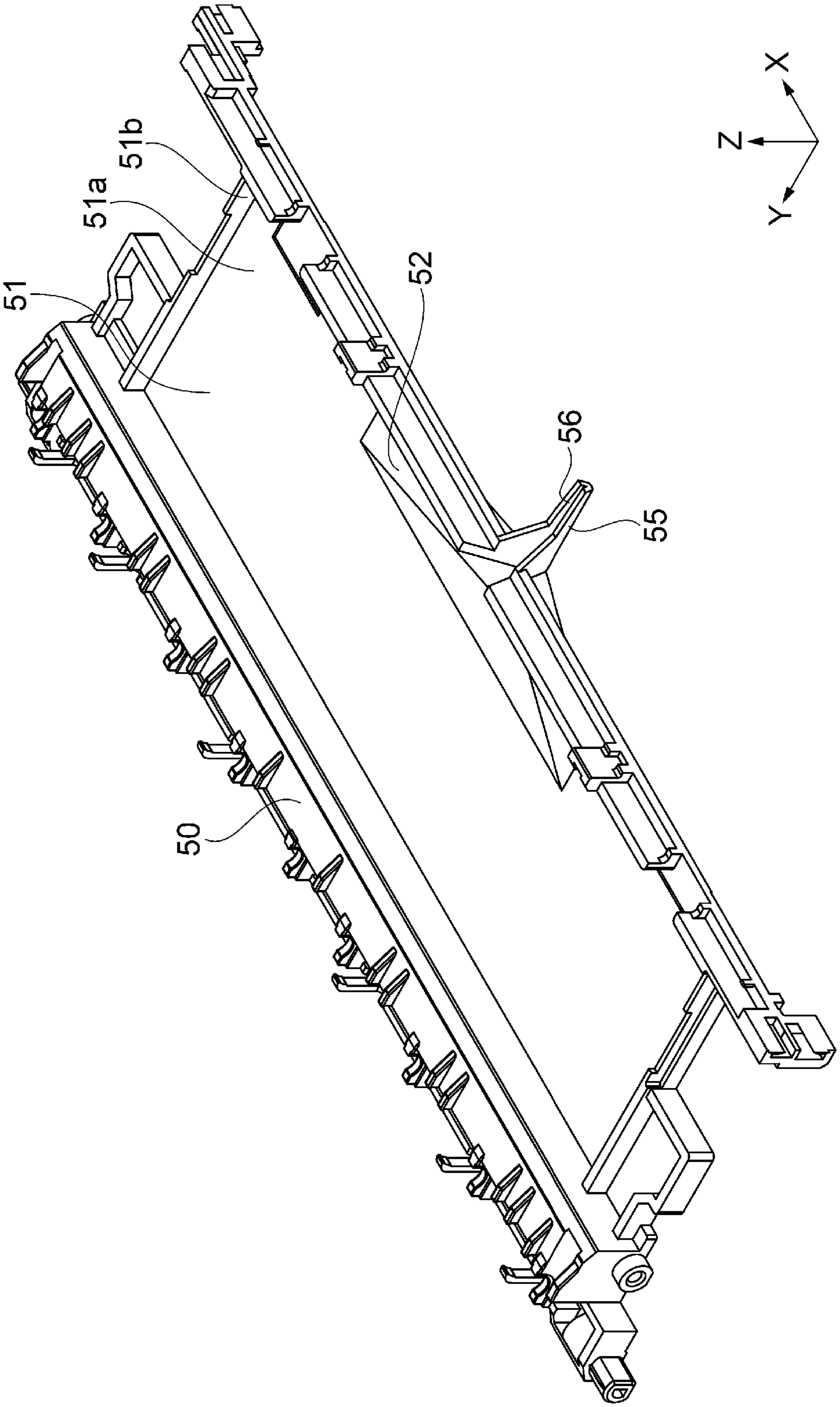
FIG. 5 is a perspective view showing the configuration of the drainage collection unit according to the first embodiment.

As shown in FIG. 5, the drainage collection unit 50 includes a receiving portion 51 to receive the drainage that flows out of the platen 34. The receiving portion 51 includes a planar portion 51*a* that has a planar surface, and wall portions 51*b* that define the planar portion 51*a*. The planar portion 51*a* defined with the wall portions 51*b* receives the drainage that flows out of the platen 34.

The drainage collection unit 50 includes a recessed portion 52 that is recessed downward from the planar surface of the planar portion 51*a*. The recessed portion 52 is located at a central portion in the direction along the x axis of the drainage collection unit 50. In this way, it is possible to lead the drainage on the planar portion 51*a* easily to the recessed portion 52.

The drainage collection unit 50 collects the waste liquid that comes into being at the time of the borderless printing as the drainage. Without limitation to the foregoing, the drainage collection unit 50 can collect the waste liquid discharged at the time of cleaning and the waste liquid discharged at the time of flushing by the maintenance unit 40 as the drainage through the cap 41.

The drainage collection unit 50 includes a discharge portion 55 that discharges the collected drainage to the drainage container 60. The discharge portion 55 of this embodiment is provided with a groove portion 56 that projects in the −y direction and causes the drainage to flow therein. The groove portion 56 includes an elongated dent that extends along the y axis. An external shape of the discharge portion 55 is formed such that its dimension along the x axis is gradually reduced in the −y direction. The external shape of the discharge portion 55 is formed such that its dimension along the z axis is gradually reduced in the −y direction. In other words, the external shape of the discharge portion 55 is formed into a pointed shape in the −y direction. The discharge portion 55 projects in the −y direction from a bottom portion of the recessed portion 52. In the meantime, the groove portion 56 is inclined downward in the −y direction. In this way, it is possible to lead the drainage easily from the recessed portion 52 to the drainage container 60.

The discharge portion 55 of this embodiment is located at the central portion in the direction along the x axis of the drainage collection unit 50. Instead, the discharge portion 55 may be located on the +x direction side of the drainage collection unit 50 or located on the −x direction side thereof.

Figure 6:
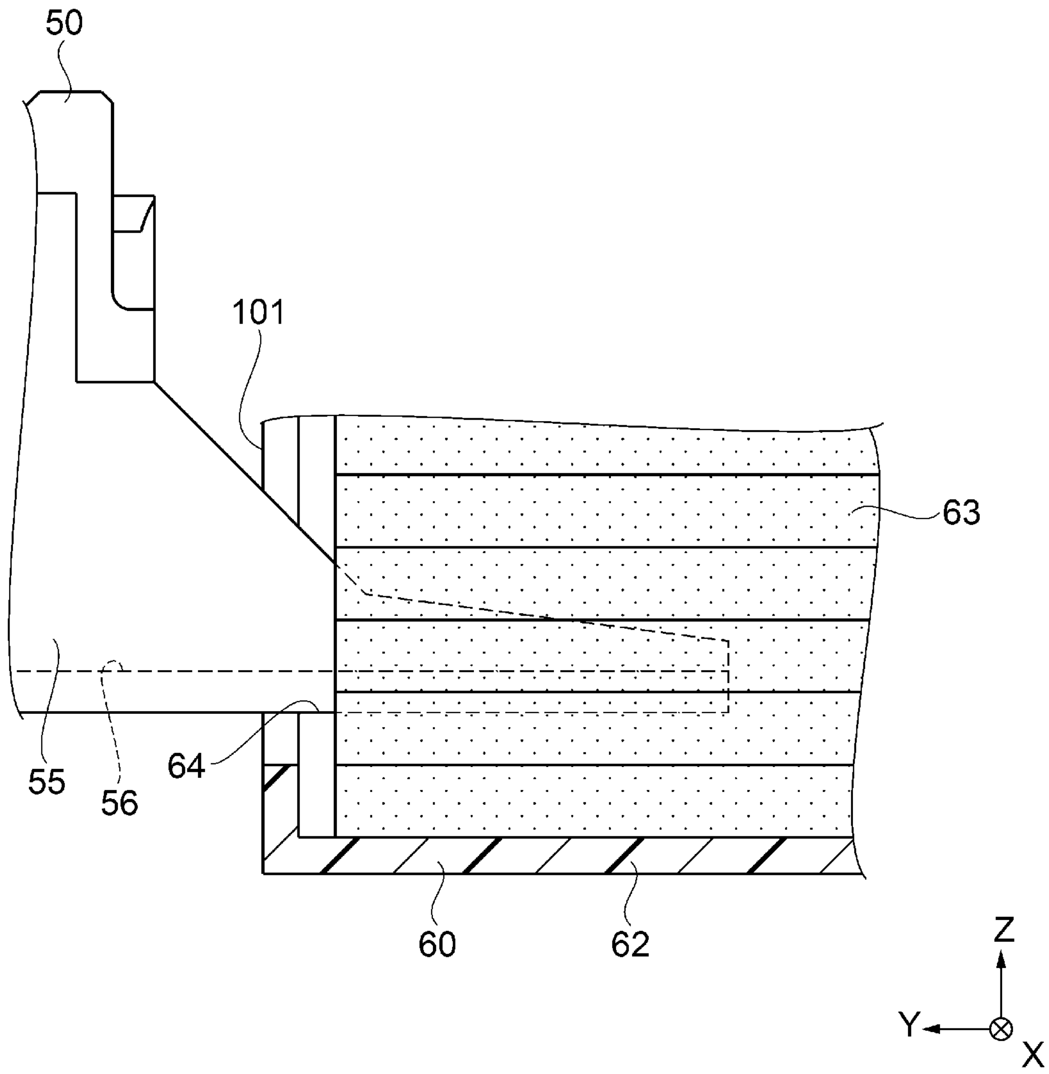
FIG. 6 is a side view showing the configuration of the drainage collection unit according to the first embodiment.

As shown in FIG. 6, a tip end portion in the −y direction of the discharge portion 55 is inserted into the drainage container 60 through an accepting portion 64. The accepting portion 64 is a portion which has an opening provided to a housing 62 of the drainage container 60, and accepts the drainage discharged from the discharge portion 55. The accepting portion 64 is provided in a first surface 101 of the housing 62. The first surface 101 of this embodiment is an end surface in the +y direction of the housing 62 in a state where the drainage container 60 is attached to the apparatus body 12. In this embodiment, an absorber 63 for absorbing the drainage is spread over the inside of the housing 62 of the drainage container 60. The absorber 63 is made of an unwoven fabric or a sponge material, for example. Therefore, in this embodiment, the drainage collected by the drainage collection unit 50 is introduced into the housing 62 through the accepting portion 64, and the introduced drainage is absorbed and retained by the absorber 63. Retention of the drainage makes it possible to suppress dripping of the drainage more effectively. Since the external shape of the discharge portion 55 is pointed in the −y direction, the discharge portion 55 can be easily inserted into the drainage container 60. The drainage can be reliably poured into the drainage container 60 by inserting the discharge portion 55 into the drainage container 60 through the accepting portion 64. The groove portion 56 of the discharge portion 55 easily comes into contact with the absorber 63. Accordingly, the drainage discharged through the groove portion 56 of the discharge portion 55 is absorbed by the absorber 63. It is possible to keep the drainage from leaking out of the accepting portion 64.

Next, a configuration of the drainage container 60 will be described.

The drainage container 60 stores the drainage that comes into being inside the apparatus body 12, through the drainage collection unit 50.

Figure 7:
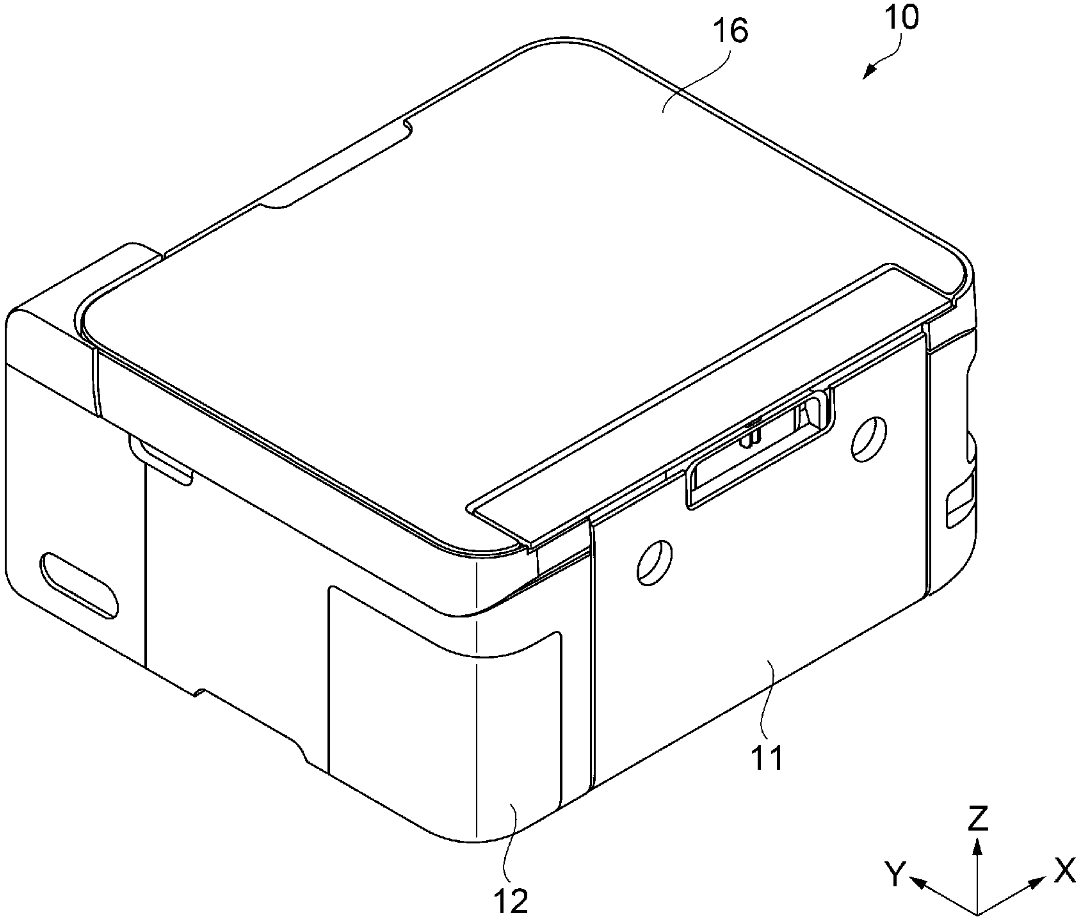
FIG. 7 is another perspective view showing the configuration of the recording apparatus according to the first embodiment.

The drainage container 60 is attachable to and detachable from the recording apparatus 10 (the apparatus body 12) as the apparatus including the discharge portion 55. Since there is a limitation in a storable amount of the drainage in the drainage container 60, the drainage container 60 needs to be replaced with a new drainage container 60. Accordingly, when the drainage in the drainage container 60 reaches a prescribed storage amount, the drainage container 60 in use is detached from the apparatus body 12 and the new drainage container 60 is attached to the apparatus body 12. In this case, the user detaches a rear surface cover 11, which is attached to a rear surface side of the apparatus body 12, from the apparatus body 12 as shown in FIG. 7.

Figure 8:
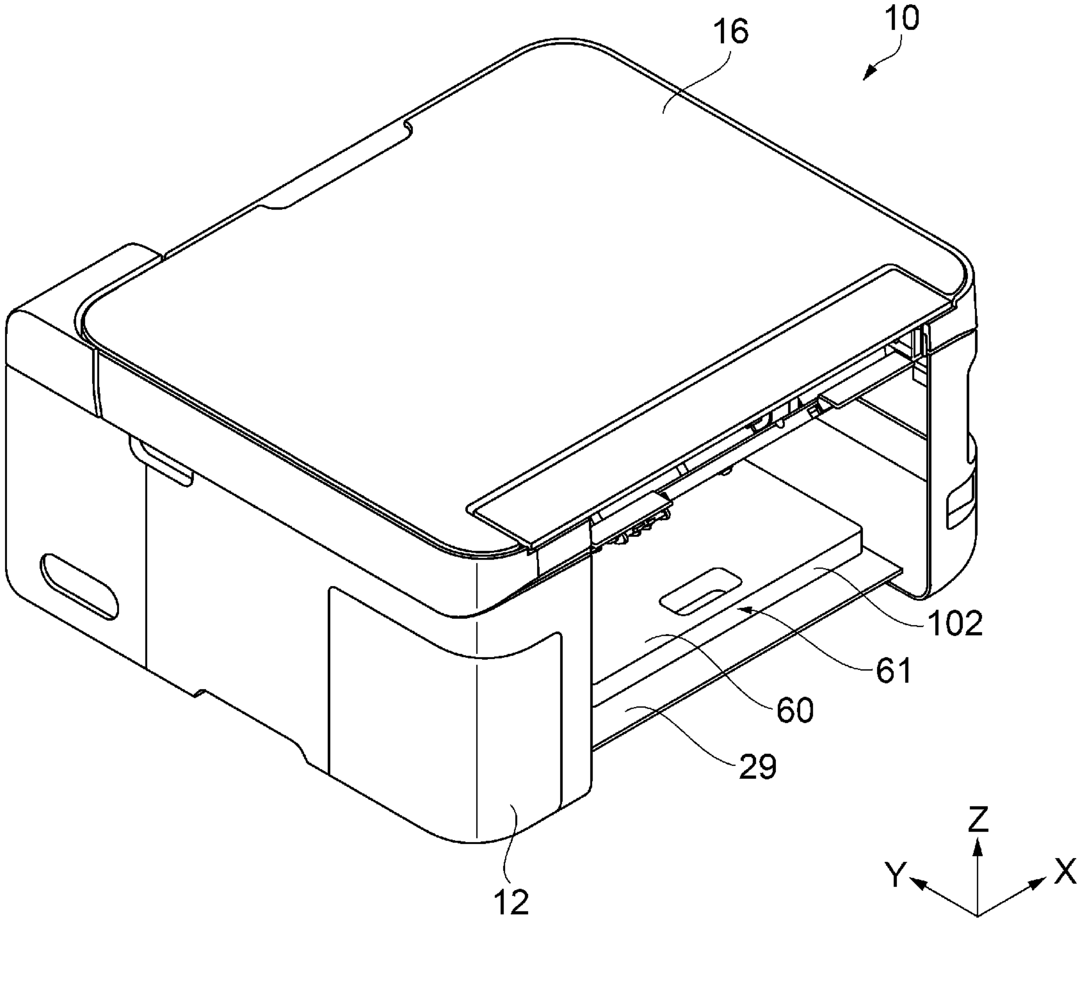
FIG. 8 is a perspective view showing a configuration of a drainage container according to the first embodiment.

Accordingly, the drainage container 60 is exposed as shown in FIG. 8. The drainage container 60 is disposed in a state of being supported by a bottom plate portion 29. The drainage container 60 is provided with a gripping portion 61 to be gripped with hand fingers. The gripping portion 61 is provided at a second surface 102, which is an opposite surface of the first surface 101 where the accepting portion 64 of the drainage container 60 is provided. The second surface 102 of this embodiment is an end surface in the −y direction of the housing 62 in the state where the drainage container 60 is attached to the apparatus body 12.

The user can detach the drainage container 60 from the apparatus body 12 by holding the gripping portion 61 with the hand fingers and pulling the gripping portion 61 in the −y direction.

When attaching the drainage container 60 to the apparatus body 12, the drainage container 60 is inserted into the apparatus body 12 while aligning the accepting portion 64 in the +y direction, and then the drainage container 60 is set onto the bottom plate portion 29. Then, the user attaches the rear surface cover 11 to the rear surface side of the apparatus body 12. Since the gripping portion 61 is provided on the opposite side of the accepting portion 64, it is easy to attach and detach the accepting portion 64 to and from the discharge portion 55 while holding the gripping portion 61.

Here, the first surface 101 and the second surface 102 are surfaces that intersect with an attachment/detachment direction of the drainage container 60 to and from the apparatus body 12. The attachment/detachment direction in this embodiment is a direction in the y axis. Specifically, the direction of attachment is the +y direction and the direction of detachment is the −y direction. The first surface 101 where the accepting portion 64 is located is opposed to the discharge portion 55 in terms of the attachment/detachment direction. Accordingly, it is easy to couple the accepting portion 64 to the discharge portion 55.

Here, when the amount of drainage inside the drainage container 60 reaches the prescribed amount as mentioned above, this drainage container 60 needs to be replaced with the new drainage container 60. However, if such a period of replacement of the drainage container 60 is relatively short, the user is required to conduct quite a number of procedures for replacement work, and the user satisfaction is therefore reduced. In this regard, a possible solution is to increase an acceptable amount of the storable drainage by enlarging the drainage container 60. However, enlargement of the drainage container 60 results in an increase in size of the recording apparatus 10.

In this embodiment, instead of enlarging the drainage container 60, an apparent storage capacity of the drainage in the drainage container 60 is increased by efficiently evaporating the drainage stored in the drainage container 60, so that a replacement interval of the drainage container 60 can be extended.

Now, a description will be given below of a detained configuration of the drainage container 60.

Figure 9A:
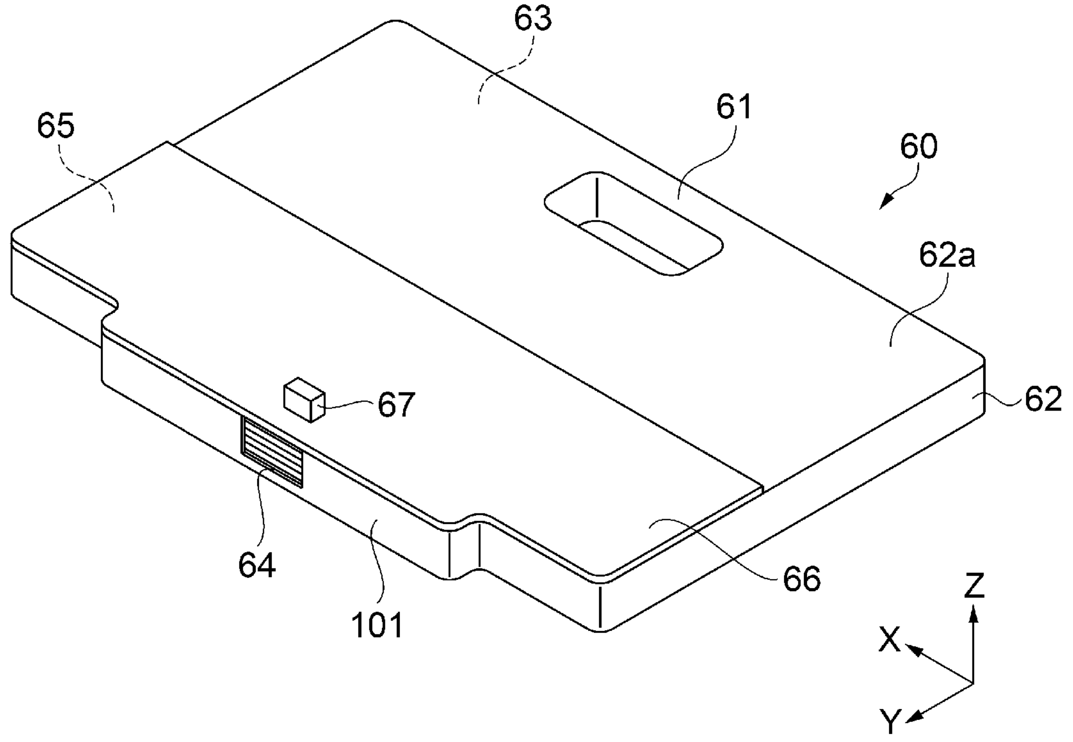
FIG. 9A is another perspective view showing the configuration of the drainage container according to the first embodiment.
Figure 9B:
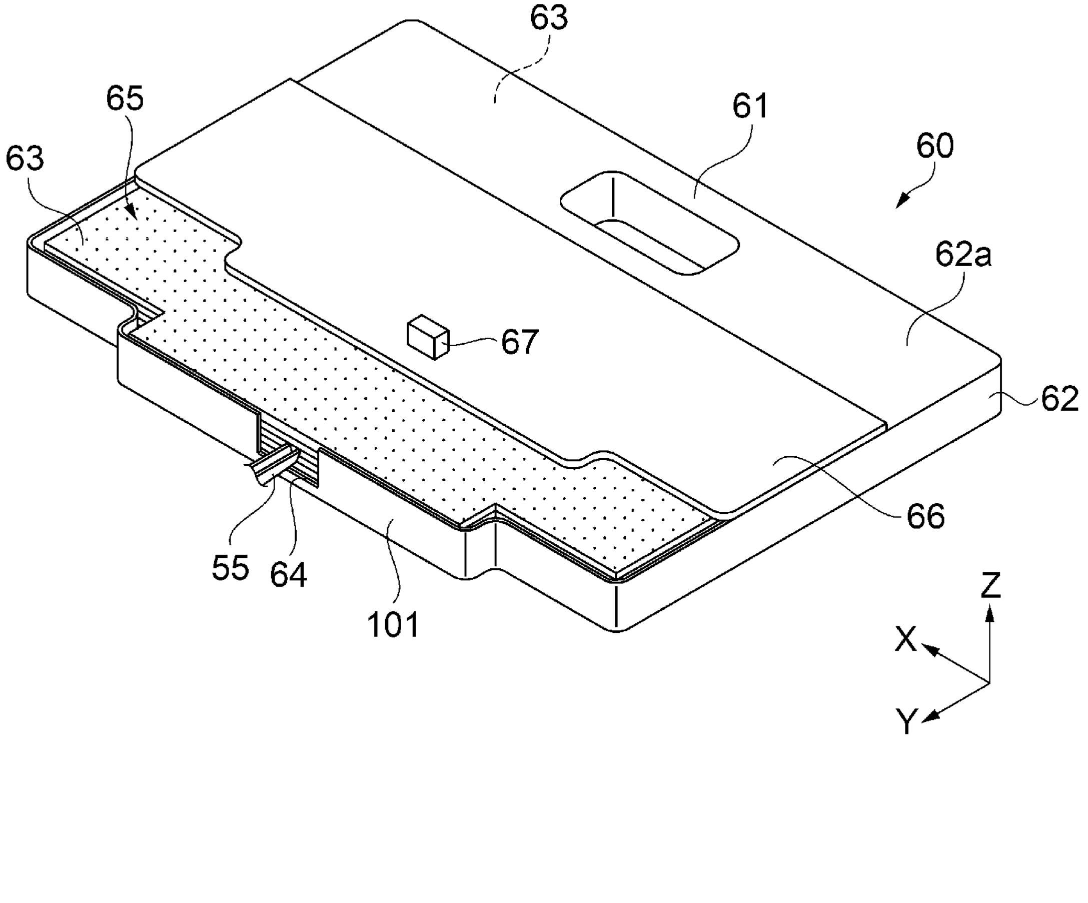
FIG. 9B is still another perspective view showing the configuration of the drainage container according to the first embodiment.

As shown in FIGS. 9A and 9B, the drainage container 60 includes the housing 62 made of a resin material. The housing 62 is a container that can store the drainage. The housing 62 is formed substantially into a rectangular parallelepiped. Regarding the housing 62 of this embodiment, a dimension in the direction along the x axis is longer than a dimension in the direction along the y axis, and a dimension in the direction along the z axis is shorter than the dimension in the direction along the x axis.

The accepting portion 64 coupled to the discharge portion 55 is located at a certain portion of the housing 62 of the drainage container 60. The accepting portion 64 is provided in the first surface 101 serving as the end surface in the +y direction of the housing 62. The accepting portion 64 of this embodiment is provided with an opening (a through hole), and the drainage collected by the drainage collection unit 50 is introduced into the housing 62 through the accepting portion 64.

The accepting portion 64 of this embodiment is located at a central portion in the direction along the x axis of the first surface 101. Note that the accepting portion 64 does not always have to be located at the central portion in the direction along the x axis of the first surface 101.

An opening 65 is formed at an upper surface 62*a* in the +z direction of the housing 62. The opening 65 is an opening provided to the housing 62 and is a portion to expose the inside of the housing 62. There is provided a lid portion 66 that can open and close the opening 65.

The opening 65 is provided closer to the accepting portion 64 than the gripping portion 61 of the housing 62 is. The opening 65 of this embodiment is formed across the entire region of the housing 62 in the direction along the x axis which originates from an end portion in the +y direction of the housing 62.

The lid portion 66 is a plate member. The lid portion 66 is disposed in line with the upper surface 62*a*.

The lid portion 66 has a shape and a size similar to the opening 65 in plan view. When the lid portion 66 is in the open state, substantially the entire opening 65 is open so as to expose the absorber 63 in the housing 62. On the other hand, the entire opening 65 is blocked when the lid portion 66 is in the closed state. Here, the lid portion 66 may be formed larger than the opening 65 as long as the opening 65 is sufficiently covered.

In this embodiment, the lid portion 66 takes on the open state to open the opening 65 when the drainage container 60 is attached to the apparatus body 12, and the lid portion 66 takes on the closed state to block the opening 65 when the drainage container 60 is detached from the apparatus body 12.

Here, in the attaching and detaching operations of the drainage container 60 to and from the apparatus body 12, timing for causing the lid portion 66 to take on the open state or the closed state may be determined at discretion.

The opening 65 is located at a different position from the accepting portion 64. Since the accepting portion 64 is the portion to be coupled to the discharge portion 55, it is necessary to consider a leakage of the drainage. Accordingly, it is difficult to form the opening portion of the accepting portion 64 in a larger size. On the other hand, since the opening 65 is located at the upper surface 62*a* of the housing 62, the opening 65 can be formed in a relatively large size. For this reason, a contact area of the inside of the housing 62 with the atmosphere is increased while the opening 65 is opened by establishing the open state of the lid portion 66. This increase can promote evaporation of the drainage stored in the housing 62, thereby accelerating drying of the drainage.

As a consequence of acceleration of the drying of the drainage in the housing 62, the apparent storage capacity of the drainage in the drainage container 60 is increased, so that the replacement interval of the drainage container 60 can be extended. It is possible to suppress the increase in size of the drainage container 60.

Furthermore, when the drainage container 60 is detached from the apparatus body 12, the lid portion 66 takes on the closed state so as to block the opening 65. Thus, it is possible to keep the drainage in the housing 62 from leaking out.

The lid portion 66 is biased in the closed state. To be more precise, the drainage container 60 includes a biasing member and the lid portion 66 is kept at the closed state by biasing force of the biasing member. For example, one end of a coil spring serving as the biasing member is coupled to the end portion in the +y direction of the housing 62, and the other end portion thereof is coupled to the lid portion 66. The coil spring is in a contracted state when the lid portion 66 is in the closed state. The coil spring is in a stretched state when the lid portion 66 is in the open state. Since the lid portion 66 is biased in the closed state, it is possible to keep the lid portion 66 from being opened unintentionally when the drainage container 60 is detached from the apparatus body 12. Since the lid portion 66 is closed due to the biasing force, a driving mechanism for closing the lid portion 66 is not required. Thus, it is possible to construct an opening/closing mechanism for the lid portion 66 with a simple structure.

In the meantime, the lid portion 66 is displaced in the attachment/detachment direction of the drainage container 60. Specifically, the lid portion 66 is displaced to the open state when the drainage container 60 moves in the direction of attachment (the +y direction) relative to the apparatus body 12. On the other hand, the lid portion 66 is displaced to the closed state when the drainage container 60 moves in the direction of detachment (the −y direction) relative to the apparatus body 12. Installation of the above-described biasing member makes it possible to construct a displacement mechanism for the lid portion 66 in accordance with the attachment/detachment direction of the drainage container 60. The displacement of the lid portion 66 in the attachment/detachment direction of the drainage container 60 makes it possible to reduce a space required for displacing the lid portion 66 in a height direction of the housing 62 intersecting with an attachment/detachment direction. Thus, it is possible to reduce the size of the drainage container 60. In the meantime, since the lid portion 66 is displaced in the attachment/detachment direction of the drainage container 60, attaching and detaching operations of the drainage container 60 are easily interlocked with opening and closing operations thereof.

The lid portion 66 is displaced along the upper surface 62*a*. To be more precise, the lid portion 66 is displaced between the open state and the closed state in the direction along the y axis of the upper surface 62*a*. In this way, it is possible to reduce the space required for displacing the lid portion 66 in the height direction of the housing 62, and to reduce the size in the height direction of the housing 62. It is also possible to reduce a space in the recording apparatus 10 for displacing the lid portion 66, and thus to reduce the size in the height direction of the recording apparatus 10.

The lid portion 66 is displaced within a region of the upper surface 62*a* in top view in the open state. Specifically, the lid portion 66 which is displaced to the closed state and the open state does not spread out of the housing 62 in top view. Accordingly, it is not necessary to secure a region for displacement of the lid portion 66 on the outside of the housing 62 in top view.

Next, a description will be given of the opening/closing mechanism for the lid portion 66 of the drainage container 60 relative to the apparatus body 12.

Figure 10A:
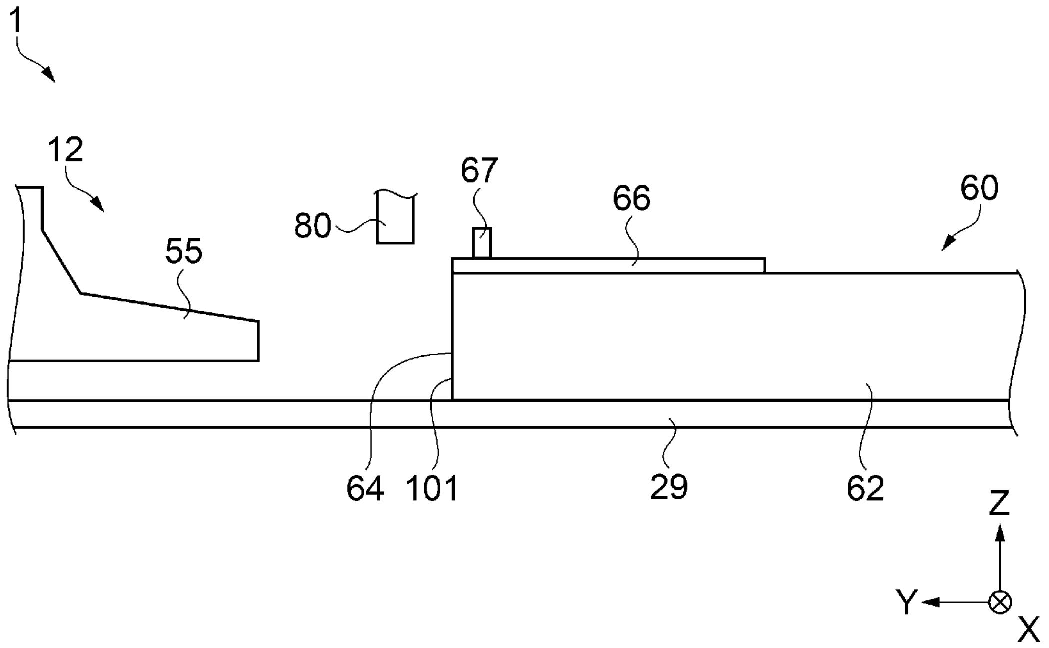
FIG. 10A is a schematic diagram showing a configuration of an opening/closing mechanism for a lid portion according to the first embodiment.

As shown in FIG. 10A, the lid portion 66 includes an abutting portion 67. The abutting portion 67 is a projection that protrudes in the +z direction. In this embodiment, the abutting portion 67 is provided at an end portion in the +y direction of the lid portion 66, and at a central portion in the direction along the x axis (FIG. 9A).

An abutted portion 80 is disposed in the apparatus body 12. The abutted portion 80 is a projection that comes into contact with the abutting portion 67 in the attaching operation of the drainage container 60. An end portion in the −z direction of the abutted portion 80 is located in the +z direction of an end portion in the −z direction of the abutting portion 67. In other words, the abutted portion 80 comes into contact only with the abutting portion 67 of the drainage container 60 which moves in the attachment/detachment direction.

Figure 10B:
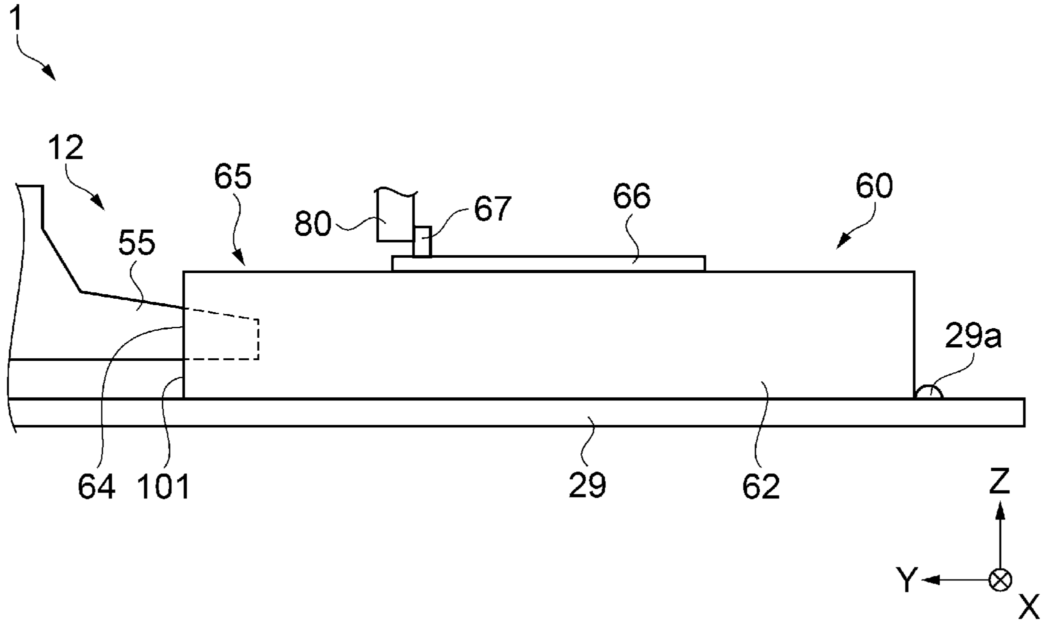
FIG. 10B is another schematic diagram showing the configuration of the opening/closing mechanism for the lid portion according to the first embodiment.

As shown in FIG. 10B, the abutting portion 67 abuts on the abutted portion 80 when the drainage container 60 is attached to the apparatus body 12 (the discharge portion 55) by moving the drainage container 60 in the direction of attachment (the +y direction). Then, as a consequence of further moving in the direction of attachment in the state of abutment, the lid portion 66 moves in the −y direction relative to the housing 62 against the biasing force, thereby being displaced to the open state. Accordingly, the opening 65 is opened to expose the inside of the housing 62 so that the drying of the drainage stored in the drainage container 60 can be accelerated. In the process of attaching the drainage container 60 to the apparatus body 12, the lid portion 66 is opened due to the abutment of the abutting portion 67 on the abutted portion 80. Accordingly, the opening/closing mechanism for the lid portion 66 can be realized by the simple structure without requiring a driving mechanism for opening the lid portion 66.

In the meantime, when the drainage container 60 moves in the direction of detachment (the −y direction), the lid portion 66 moves in the +y direction of the housing 62 due to the biasing force, and the lid portion 66 is displaced to the closed state as the abutting portion 67 is detached from the abutted portion 80. Accordingly, the opening 65 is blocked so that the leakage of the drainage from the opening 65 can be suppressed.

Here, in the state of attachment where the drainage container 60 is attached to the apparatus body 12, the drainage container 60 is in a state of repulsion in the −y direction against the biasing force in the +y direction from the biasing member provided to the lid portion 66. This is why the bottom plate portion 29 is provided with a projection 29*a* that protrudes in the +z direction. The projection 29*a* is located at a position to abut on an end portion in the −y direction of the drainage container 60 in the state of attachment where the drainage container 60 is attached to a prescribed position of the apparatus body 12. Thus, the movement of the drainage container 60 in the −y direction is suppressed in the state of attachment of the drainage container 60, and it is possible to retain the state of attachment of the drainage container 60. When the drainage container 60 is detached from the apparatus body 12, it is possible to detach the drainage container 60 easily by lifting the drainage container 60 in such a way as to step over the projection 29*a*.

As described above, according to this embodiment, the opening 65 is provided at a position different from the accepting portion 64, so that the large opening 65 can be formed in the state of attachment of the drainage container 60. This configuration makes it possible to accelerate the drying of the drainage and to increase the apparent storage capacity of the drainage in the drainage container 60 without increasing the size of the drainage container 60. Hence, it is possible to achieve extension of the replacement interval of the drainage container 60.

Here, a point of time to replace the drainage container 60 in this embodiment is determined by an accumulated amount of the ink ejected from the recording head 32 in the cleaning operation and the flushing operation, for example. Here, the accumulated amount of the ink is subject to subtraction of an amount of the ink equivalent to the evaporation (the drying) of the ink for each predetermined time period, for instance. When the accumulated amount of the ink reaches a prescribed amount, the liquid crystal display module 23 displays the necessity of replacement of the drainage container 60. Thereafter, the user detaches the drainage container 60 and attaches the new drainage container 60. When the new drainage container 60 is attached, the accumulated amount of the ink to be ejected from the recording head 32 is reset.

2. Second Embodiment

Next, a description will be given of a second embodiment. Note that the same constituents as those in the first embodiment will be denoted by the same reference signs and overlapping explanations will be omitted.

Figure 11A:
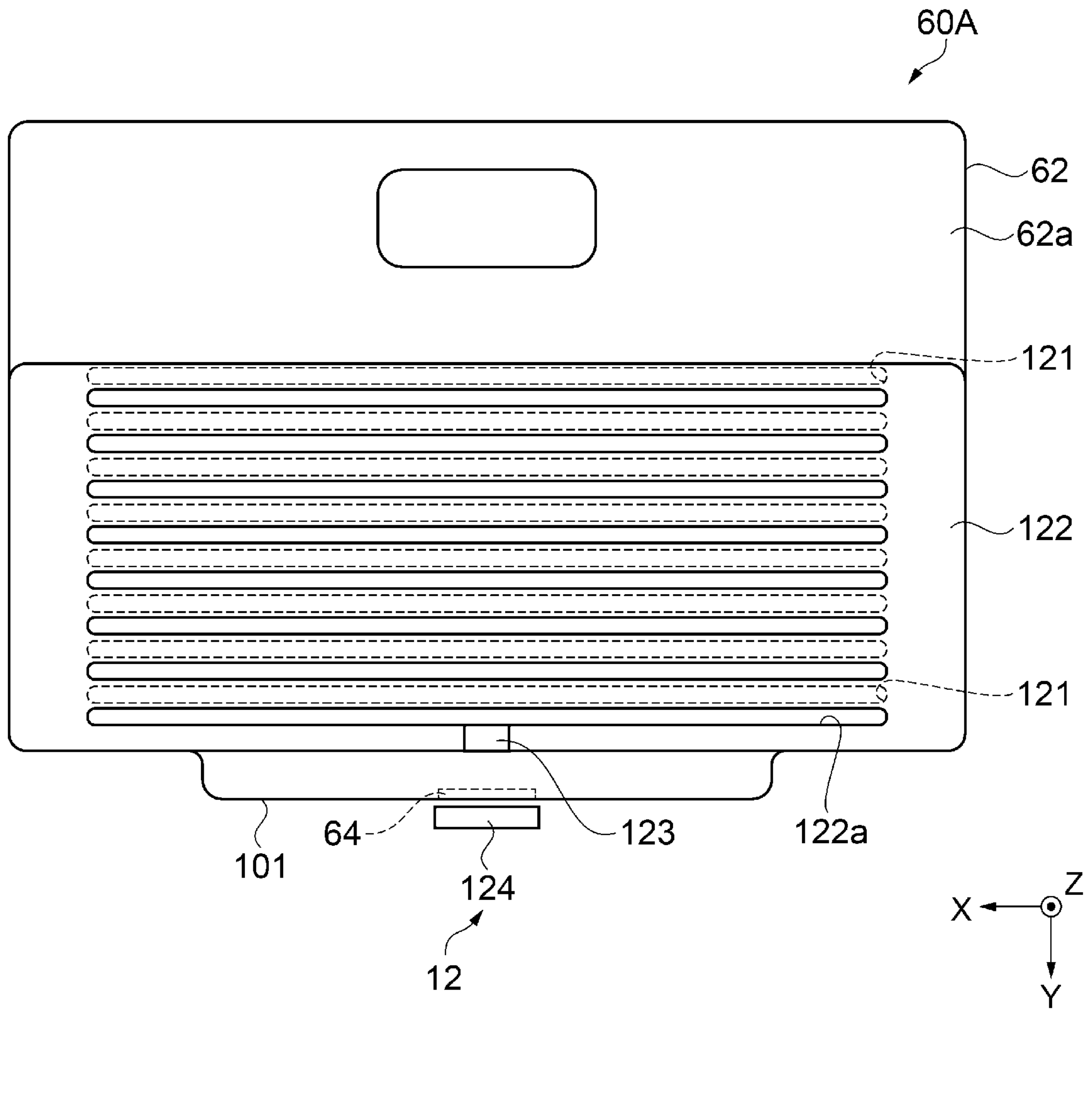
FIG. 11A is a plan view showing a configuration of a drainage container according to a second embodiment.
Figure 11B:
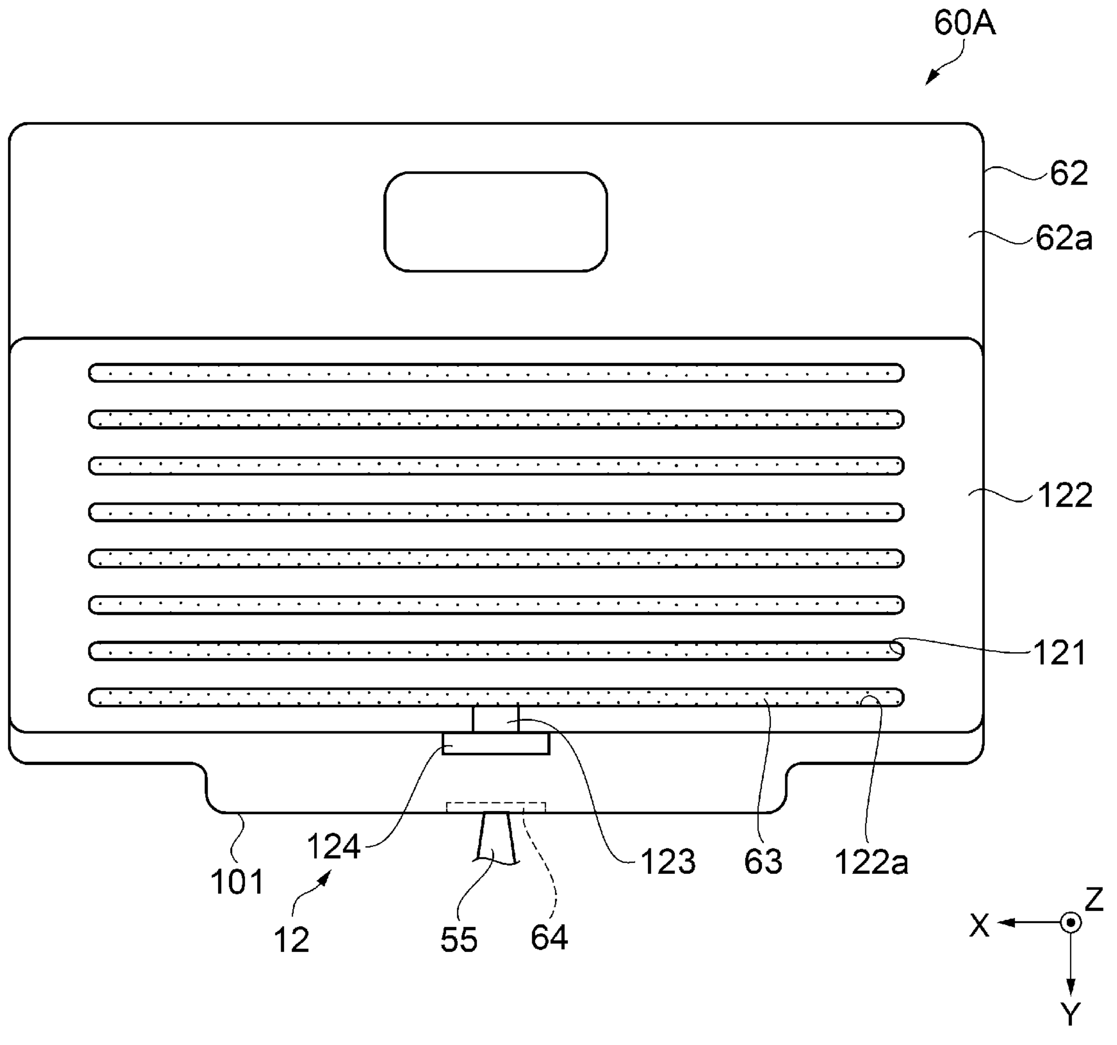
FIG. 11B is another plan view showing the configuration of the drainage container according to the second embodiment.

As shown in FIGS. 11A and 11B, a drainage container 60A includes the housing 62 that can store the drainage. The accepting portion 64 is provided in the first surface 101 constituting the end surface in the +y direction of the housing 62.

Multiple openings 121 are formed at the upper surface 62*a* in the +z direction of the housing 62. The openings 121 are openings provided to the housing 62 and are portions to expose the inside of the housing 62.

Each of the openings 121 of this embodiment is an opening of a slit shape that extends along the x axis. The openings 121 are arranged in the −y direction from an end portion in the +y direction of the upper surface 62*a*. The openings 121 are disposed at regular intervals in the direction along the y axis.

There is provided a lid portion 122 that can open and close the openings 121. The lid portion 122 is a plate member. The lid portion 122 includes slits 122*a*, which are formed at regions corresponding to the respective openings 121 in the open state. Each of the slits 122*a* is a through hole that extends along the x axis. The slits 122*a* are arranged in the −y direction from an end portion in the +y direction of the lid portion 122. Each slit 122*a* has a shape and a size similar to each opening 121. The number of the slits 122*a* is the same as the number of the openings 121. The slits 122*a* are disposed at regular intervals in the direction along the y axis.

In the closed state of the lid portion 122, each slit 122*a* is located between the two adjacent openings 121. When the drainage container 60A is attached to the apparatus body 12, each slit 122*a* is located in a region corresponding to each opening 121, thereby setting the lid portion 122 to the open state. In this way, the absorber 63 in the housing 62 is exposed so that the drying of the drainage in the housing 62 can be accelerated.

On the other hand, when the drainage container 60A is detached from the apparatus body 12, each opening 121 is blocked by a region other than the slits 122*a* of the lid portion 122, thereby setting the lid portion 122 to the closed state. In this way, it is possible to suppress the leakage of the drainage in the housing 62.

The lid portion 122 is biased to the closed state. Here, a mechanism for biasing the lid portion 122 is the same as that in the first embodiment.

The lid portion 122 is displaced in the attachment/detachment direction of the drainage container 60A. Specifically, the lid portion 122 is displaced to the open state when the drainage container 60A moves in the direction of attachment (the +y direction) relative to the apparatus body 12. On the other hand, the lid portion 122 is displaced to the closed state when the drainage container 60A moves in the direction of detachment (the −y direction) relative to the apparatus body 12. The lid portion 122 is displaced along the upper surface 62*a*. The lid portion 122 is displaced within a region of the upper surface 62*a* in top view in the open state.

Next, a description will be given of an opening/closing mechanism for the lid portion 122 of the drainage container 60A relative to the apparatus body 12.

The lid portion 122 includes an abutting portion 123. The abutting portion 123 is a projection that protrudes in the +z direction. In this embodiment, the abutting portion 123 is provided at the end portion in the +y direction of the lid portion 122, and at a central portion in the direction along the x axis.

An abutted portion 124 is disposed in the apparatus body 12. The abutted portion 124 is a projection that comes into contact with the abutting portion 123 in the attaching operation of the drainage container 60A. An end portion in the −z direction of the abutted portion 124 is located in the +z direction of an end portion in the −z direction of the abutting portion 123. In other words, the abutted portion 124 comes into contact only with the abutting portion 123 of the drainage container 60A which moves in the attachment/detachment direction.

As shown in FIG. 11B, the abutting portion 123 abuts on the abutted portion 124 when the drainage container 60A is attached to the apparatus body 12 (the discharge portion 55) by moving the drainage container 60A in the direction of attachment (the +y direction). Then, as a consequence of further moving in the direction of attachment in the state of abutment, the lid portion 122 moves in the −y direction relative to the housing 62 against the biasing force, thereby being displaced to the open state. Accordingly, the openings 121 are opened to expose the inside of the housing 62 so that the drying of the drainage stored in the drainage container 60A can be accelerated.

In the meantime, when the drainage container 60A moves in the direction of detachment (the −y direction) as shown in FIG. 11A, the lid portion 122 moves in the +y direction relative to the housing 62 due to the biasing force, and the lid portion 122 is displaced to the closed state as the abutting portion 123 is detached from the abutted portion 124. Accordingly, the openings 121 are blocked so that the leakage of the drainage from the openings 121 can be suppressed.

According to the above-described embodiment, it is possible to open and close the openings 121 with a short moving distance of the lid portion 122, thereby increasing opening areas of the openings 121 effectively.

3. Third Embodiment

Next, a description will be given of a third embodiment. Note that the same constituents as those in the first embodiment will be denoted by the same reference signs and overlapping explanations will be omitted.

Figure 12A:
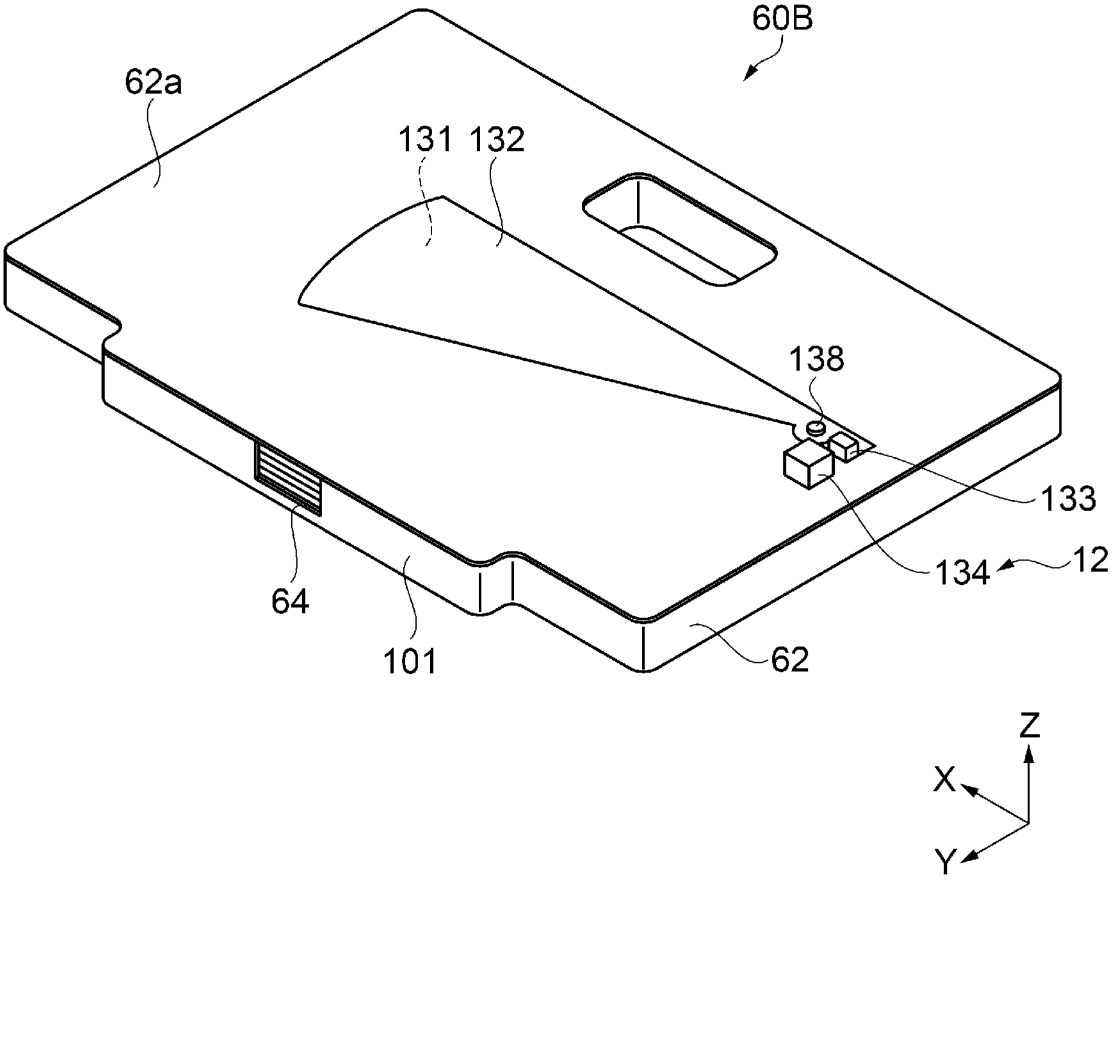
FIG. 12A is a perspective view showing a configuration of a drainage container according to a third embodiment.
Figure 12B:
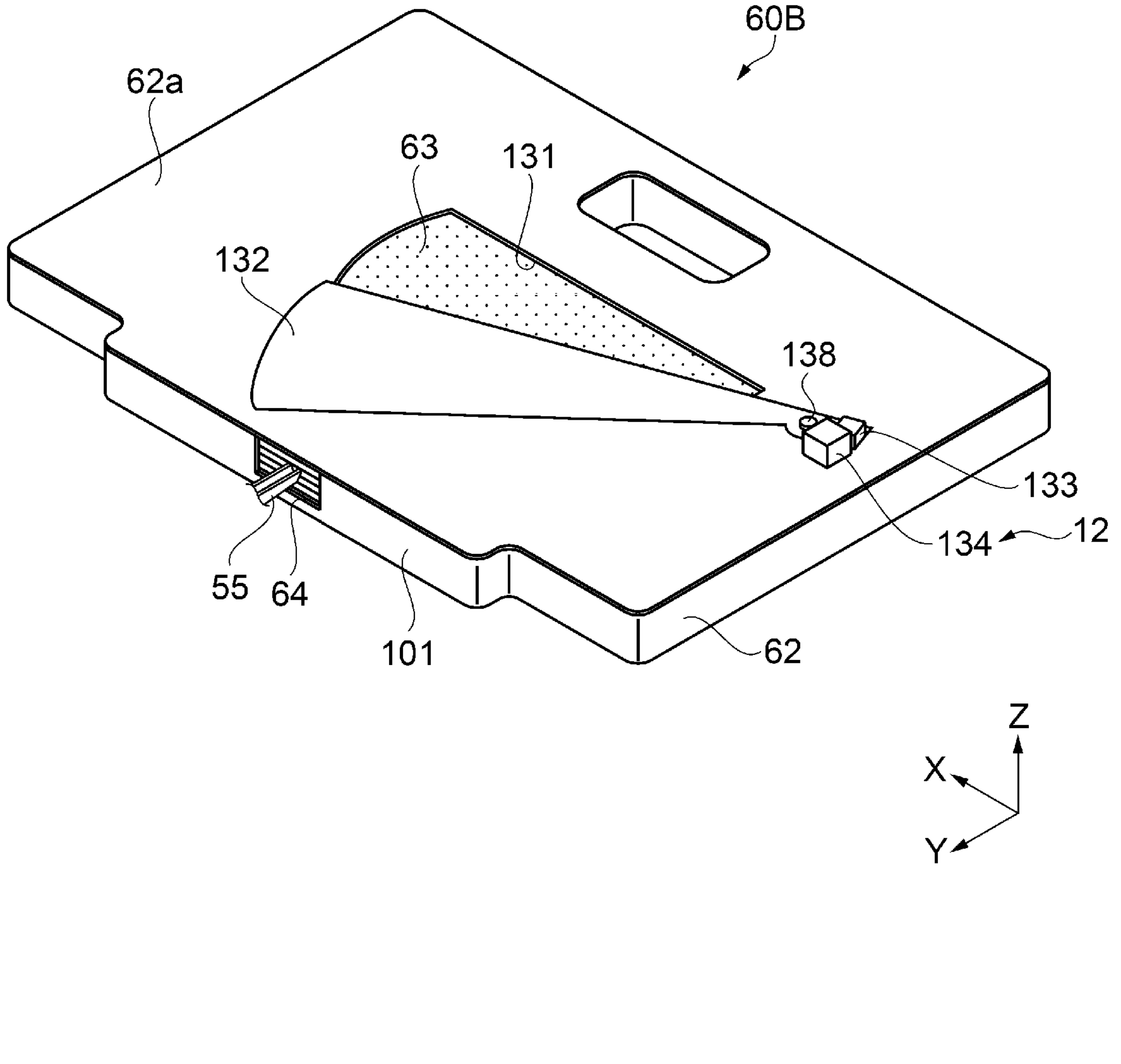
FIG. 12B is another perspective view showing the configuration of the drainage container according to the third embodiment.

As shown in FIGS. 12A and 12B, a drainage container 60B includes the housing 62 that can store the drainage. The accepting portion 64 is provided in the first surface 101 constituting the end surface in the +y direction of the housing 62.

An opening 131 is formed at the upper surface 62*a* in the +z direction of the housing 62. The opening 131 is an opening provided to the housing 62 and is a portion to expose the inside of the housing 62.

The opening 131 of this embodiment is an opening of a fan shape that forms an arc at an end portion thereof. The opening 131 is provided at a central portion of the upper surface 62*a*.

There is provided a lid portion 132 that can open and close the opening 131. The lid portion 132 is a plate member. The lid portion 132 has a shape and a size similar to the opening 131. When the drainage container 60B is attached to the apparatus body 12, the lid portion 132 moves to a region other than the opening 131, thereby setting the lid portion 132 to the open state. In this way, the absorber 63 in the housing 62 is exposed so that the drying of the drainage in the housing 62 can be accelerated. Here, the lid portion 132 may be formed larger than the opening 131 as long as the opening 131 is sufficiently covered.

On the other hand, when the drainage container 60B is detached from the apparatus body 12, the opening 131 is blocked by the lid portion 132, whereby the lid portion 132 takes on the closed state. In this way, it is possible to suppress the leakage of the drainage in the housing 62.

The lid portion 132 is biased in the closed state. To be more precise, the drainage container 60B includes a biasing member and the lid portion 132 is kept at the closed state by biasing force of the biasing member. For example, one end of a coil spring serving as the biasing member is coupled to an end portion in the +x direction which is also an end portion in the −y direction of the lid portion 132, and the other end portion thereof is coupled to the upper surface 62*a* on the −y direction side of the lid portion 132. The coil spring is in a contracted state when the lid portion 132 is in the closed state, and the coil spring is in a stretched state when the lid portion 132 is in the open state. Accordingly, since the lid portion 132 is biased in the closed state, it is possible to keep the lid portion 132 from being opened unintentionally when the drainage container 60B is detached from the apparatus body 12.

The lid portion 132 is displaced in the attachment/detachment direction of the drainage container 60B. Specifically, the lid portion 132 is displaced to the open state when the drainage container 60B moves in the direction of attachment (the +y direction) relative to the apparatus body 12. On the other hand, the lid portion 132 is displaced to the closed state when the drainage container 60B moves in the direction of detachment (the −y direction) relative to the apparatus body 12. The lid portion 132 is displaced along the upper surface 62*a*. The lid portion 132 is displaced within the region of the upper surface 62*a* in top view in the open state.

Next, a description will be given of an opening/closing mechanism for the lid portion 132 of the drainage container 60B relative to the apparatus body 12.

The lid portion 132 includes an abutting portion 133. The abutting portion 133 is a projection that protrudes in the +z direction. In this embodiment, the abutting portion 133 is located at an end portion of the lid portion 132 on the opposite side of its end portion where the arc is formed. A rotary shaft 138 that can turn the lid portion 132 is provided at a portion of the upper surface 62*a* of the housing 62 located between the end portion of the arc of the lid portion 132 and the abutting portion 133. The rotary shaft 138 is a shaft that extends in the +z direction from the upper surface 62*a*. The rotary shaft 138 penetrates the lid portion 132 in the height direction. The lid portion 132 is turned pivotally around the rotary shaft 138, thereby being displaced to the closed state and the open state.

An abutted portion 134 is disposed in the apparatus body 12. The abutted portion 134 is a projection that comes into contact with the abutting portion 133 in the attaching operation of the drainage container 60B. An end portion in the −z direction of the abutted portion 134 is located in the +z direction of an end portion in the −z direction of the abutting portion 133. In other words, the abutted portion 134 comes into contact only with the abutting portion 133 of the drainage container 60B which moves in the attachment/detachment direction.

As shown in FIG. 12B, the abutting portion 133 abuts on the abutted portion 134 when the drainage container 60B is attached to the apparatus body 12 (the discharge portion 55) by moving the drainage container 60B in the direction of attachment (the +y direction). Then, as a consequence of further moving in the direction of attachment in the state of abutment, the abutting portion 133 is turned in a counterclockwise direction around the rotary shaft 138. For this reason, the lid portion 132 moves in the counterclockwise direction against the biasing force, thereby being displaced to the open state. Accordingly, the opening 131 is opened to expose the inside of the housing 62, so that the drying of the drainage stored in the drainage container 60B can be accelerated.

In the meantime, when the drainage container 60B moves in the direction of detachment (the −y direction) as shown in FIG. 12A, the lid portion 132 is turned in a clockwise direction around the rotary shaft 138 due to the biasing force. As the abutting portion 133 is detached from the abutted portion 134, the lid portion 132 is displaced to the closed state. Accordingly, the opening 131 is blocked so that the leakage of the drainage from the opening 131 can be suppressed.

According to the above-described embodiment, it is possible to carry out the opening and closing operations of the lid portion 132 with the simple structure provided with the rotary shaft 138.

4. Fourth Embodiment

Next, a description will be given of a fourth embodiment. Note that the same constituents as those in the first embodiment will be denoted by the same reference signs and overlapping explanations will be omitted.

Figure 13A:
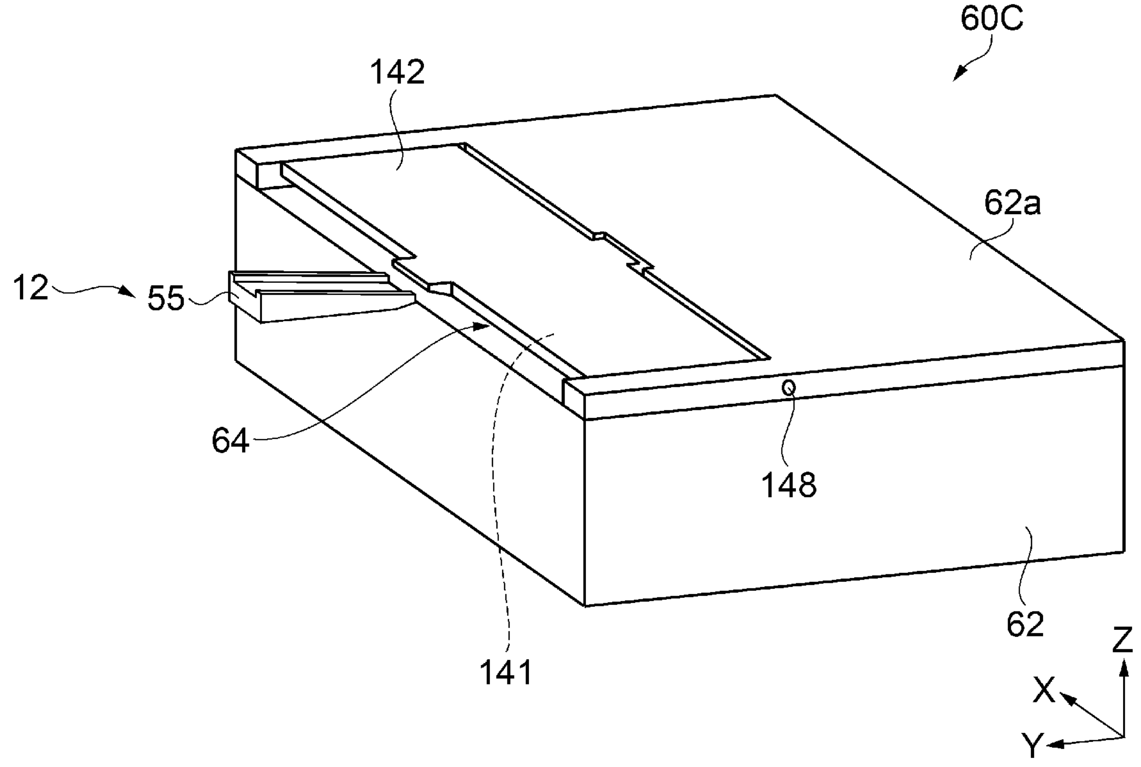
FIG. 13A is a perspective view showing a configuration of a drainage container according to a fourth embodiment.
Figure 13B:
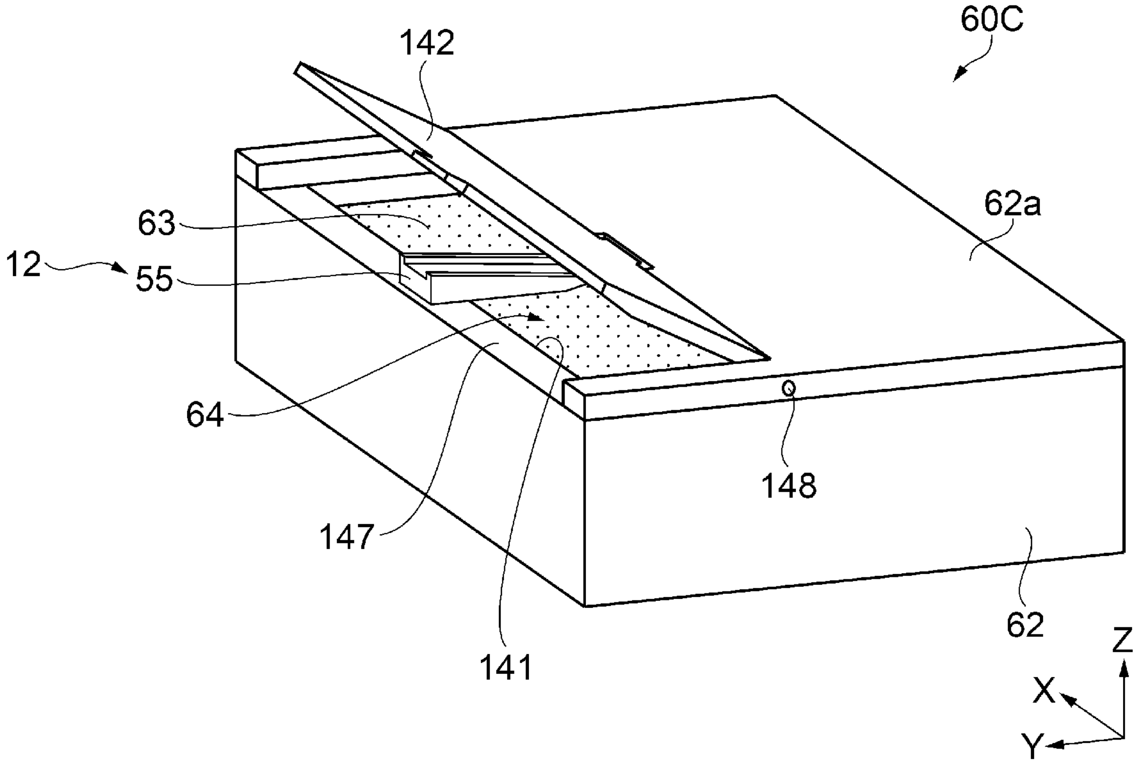
FIG. 13B is another perspective view showing the configuration of the drainage container according to the fourth embodiment.

As shown in FIGS. 13A and 13B, a drainage container 60C includes the housing 62 that can store the drainage. The accepting portion 64 is provided at the end portion in the +y direction of the upper surface 62*a* of the housing 62.

An opening 141 is formed at the upper surface 62*a* of the housing 62. The opening 141 is an opening provided to the housing 62 and is a portion to expose the inside of the housing 62. The opening 141 of this embodiment is provided on the +y direction side of the upper surface 62*a*. The opening 141 is formed into a rectangle in plan view.

There is provided a lid portion 142 that can open and close the opening 141. The lid portion 142 is a plate member which has a shape and a size similar to the opening 141. The lid portion 142 takes on the open state when the drainage container 60C is attached to the apparatus body 12. Accordingly, the absorber 63 in the housing 62 is exposed so that the drying of the drainage in the housing 62 can be accelerated. Here, the lid portion 142 may be formed larger than the opening 141 as long as the opening 141 is sufficiently covered.

On the other hand, when the drainage container 60C is detached from the apparatus body 12, the opening 141 is blocked by the lid portion 142, whereby the lid portion 142 takes on the closed state. In this way, it is possible to suppress the leakage of the drainage in the housing 62.

A rotary shaft 148 that extends in the direction along the x axis is disposed at an end portion in the −y direction of the lid portion 142. The lid portion 142 is turned pivotally around the rotary shaft 148 and can thus be displaced to the closed state and the open state.

The lid portion 142 is biased in the closed state. For example, a twisted portion of a torsion spring serving as the biasing member is fitted into the rotary shaft 148, and one end of the torsion spring is coupled to the lid portion 142 while the other end thereof is coupled to the housing 62. Since the lid portion 142 is biased in the closed state, it is possible to keep the lid portion 142 from being opened unintentionally when the drainage container 60C is detached from the apparatus body 12.

Next, a description will be given of an opening/closing mechanism for the lid portion 142 of the drainage container 60C relative to the apparatus body 12.

The lid portion 142 is displaced along with the attaching and detaching operations of the drainage container 60C. Specifically, an end portion in the +y direction of the lid portion 142 comes into contact with the discharge portion 55 when the drainage container 60C moves in the direction of attachment (the +y direction) relative to the apparatus body 12. When the drainage container 60C moves further in the +y direction, the discharge portion 55 is inserted between the lid portion 142 and the housing 62. Then, by moving further in the direction of attachment, the lid portion 142 moves in the clockwise direction around the rotary shaft 148 against the biasing force, whereby the lid portion 142 is displaced to the open state. Accordingly, the opening 141 is opened to expose the inside of the housing 62, so that the drying of the drainage stored in the drainage container 60C can be accelerated.

On the other hand, when the drainage container 60C moves in the direction of detachment (the −y direction), the lid portion 142 moves in the counterclockwise direction around the rotary shaft 148 due to the biasing force, and the lid portion 142 is displaced to the closed state when the discharge portion 55 is detached from the lid portion 142. Accordingly, the opening 141 is blocked so that the leakage of the drainage from the opening 141 can be suppressed. Here, the closed state is retained by causing the end portion in the +y direction of the lid portion 142 to come into contact with a control surface 147 at the end portion in the +y direction of the housing 62.

According to the above-described embodiment, it is possible to carry out the opening and closing operations of the lid portion 142 with the simple structure provided with the rotary shaft 148.

5. Fifth Embodiment

Next, a description will be given of a fifth embodiment. Note that the same constituents as those in the first embodiment will be denoted by the same reference signs and overlapping explanations will be omitted.

In the first embodiment, the attachment/detachment direction of the drainage container 60 is the direction along the y axis. On the other hand, in this embodiment, an attachment/detachment direction of a drainage container 60D is a direction along the z axis.

Now, a specific configuration of the embodiment will be described below.

Figure 14:
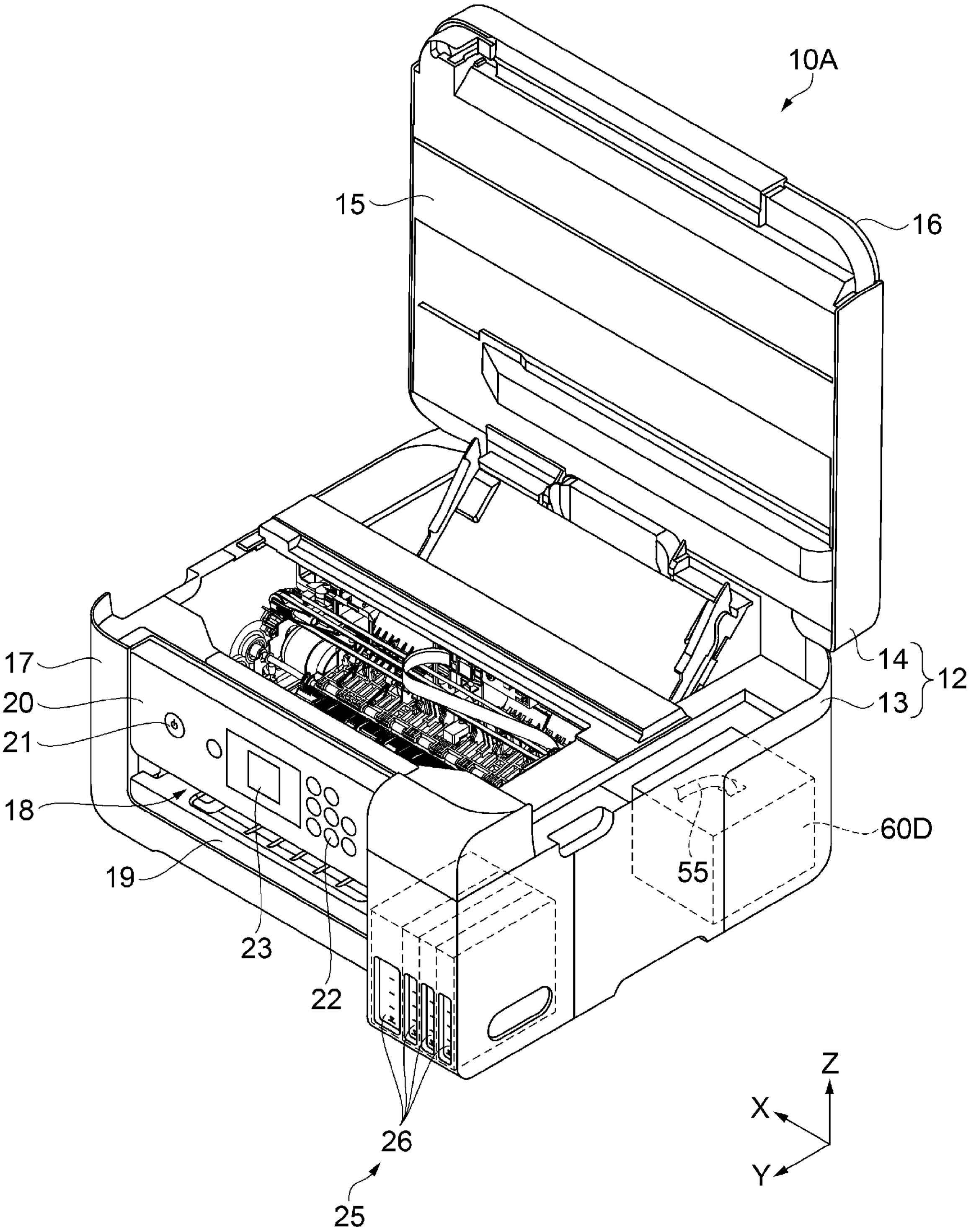
FIG. 14 is a perspective view showing a configuration of a recording apparatus according to a fifth embodiment.

FIG. 14 is a perspective view showing a configuration of a recording apparatus 10A of this embodiment. A drainage container 60D of this embodiment is provided at an end portion in the −y direction inside the apparatus body 12 and at an end portion in the −x direction.

When the drainage container 60D is attached to and detached from the apparatus body 12, the original reading device 14 is displaced to an open state. The original reading device 14 is provided to be openable and closable pivotally around a rotary shaft (not shown) that extends parallel to the direction along the x axis.

By setting the original reading device 14 to the open state, the inside of the apparatus body 12 is exposed so that the drainage container 60D is accessible. The drainage container 60D can be detached from the apparatus body 12 by pulling the drainage container 60D upward which is attached to the inside of the apparatus body 12. The drainage container 60D can be attached to the apparatus body 12 by inserting the drainage container 60D downward.

Figure 15A:
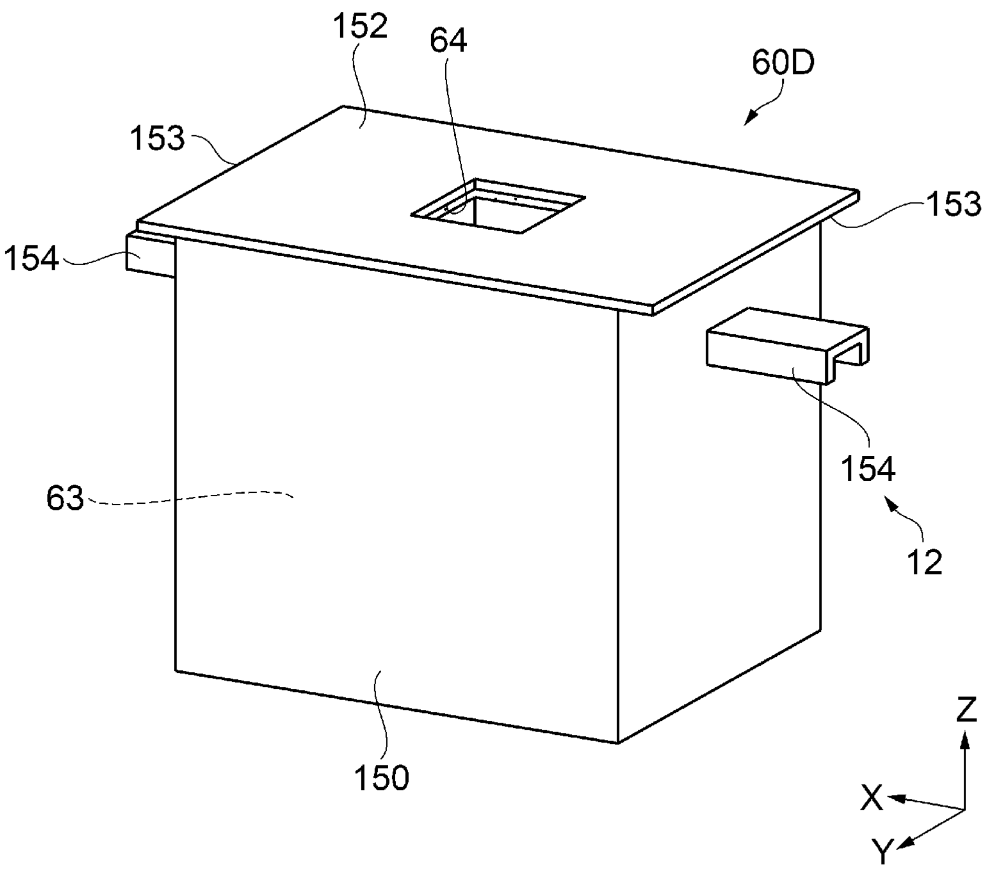
FIG. 15A is a schematic diagram showing a configuration of a drainage container according to the fifth embodiment.
Figure 15B:
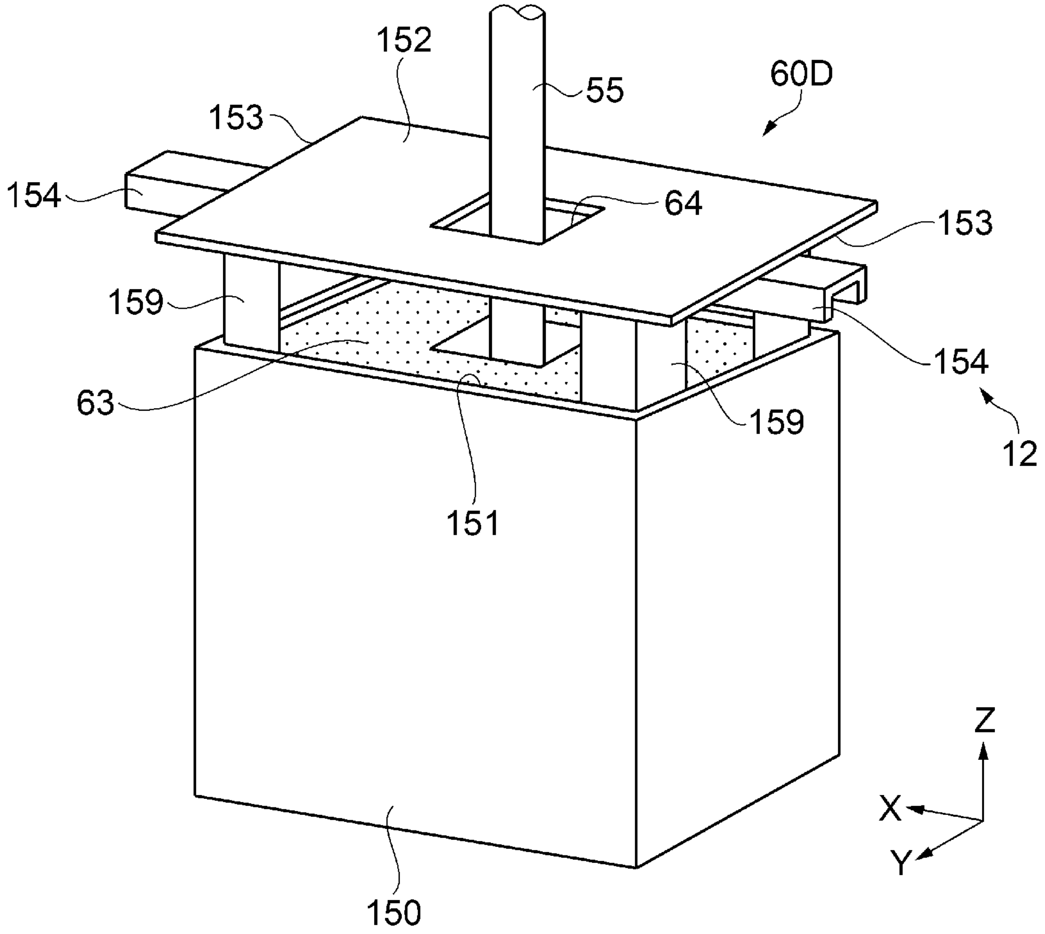
FIG. 15B is another schematic diagram showing the configuration of the drainage container according to the fifth embodiment.

As shown in FIGS. 15A and 15B, the drainage container 60D includes a housing 150 that can store the drainage. The housing 150 is a container having a bottomed box shape, which is provided with an opening 151 that is open in the +z direction. The absorber 63 is stored in the housing 150.

In the meantime, the drainage container 60D is provided with a lid portion 152 that can open and close the opening 151. The lid portion 152 is a plate member which is larger than the opening 151 in plan view. In the closed state, the lid portion 152 is supported at an end portion in the +z direction of the housing 150.

Guide portions 159 formed at four corners of the opening 151 of the housing 150 and configured to guide the lid portion 152 are provided at a lower surface of the lid portion 152. Movement of the guide portions 159 along side walls makes it possible to displace the lid portion 152 smoothly.

The lid portion 152 is provided with the accepting portion 64 that accepts the drainage discharged from the discharge portion 55. The accepting portion 64 is an opening formed at the lid portion 152. In this embodiment, the tip end portion of the discharge portion 55 is configured to be inserted from the accepting portion 64 into the housing 150. Here, the mode of acceptance of the discharge portion 55 by the accepting portion 64 only needs to be the mode in which the accepting portion 64 can accept the drainage. Besides the mode in which the discharge portion 55 is inserted into the accepting portion 64, the mode of acceptance may be a mode in which the discharge portion 55 comes into contact with the accepting portion 64, or a mode in which the discharge portion 55 is located away from the accepting portion 64.

The lid portion 152 takes on the open state when the drainage container 60D is attached to the apparatus body 12. Accordingly, the absorber 63 in the housing 150 is exposed so that the drying of the drainage in the housing 150 can be accelerated.

On the other hand, the lid portion 152 takes on the closed state when the drainage container 60D is detached from the apparatus body 12. In this way, it is possible to suppress the leakage of the drainage in the housing 150.

The lid portion 152 is biased in the closed state. To be more precise, the drainage container 60D includes a biasing member and the lid portion 152 is kept at the closed state by biasing force of the biasing member. For example, one end of a coil spring serving as the biasing member is coupled to an end portion in the +z direction of the housing 150, and the other end portion thereof is coupled to the lid portion 152. The coil spring is in a contracted state when the lid portion 152 is in the closed state, and the coil spring is in a stretched state when the lid portion 152 is in the open state. Accordingly, since the lid portion 152 is biased in the closed state, it is possible to keep the lid portion 152 from being opened unintentionally when the drainage container 60D is detached from the apparatus body 12. Since the lid portion 152 is closed by using the biasing force, a driving mechanism for closing the lid portion 152 is not required. Thus, it is possible to construct an opening/closing mechanism for the lid portion 152 with a simple structure.

The lid portion 152 is displaced in the attachment/detachment direction of the drainage container 60D. Specifically, the lid portion 152 is displaced to the open state when the drainage container 60D moves in the direction of attachment (the −z direction) relative to the apparatus body 12. On the other hand, the lid portion 152 is displaced to the closed state when the drainage container 60D moves in the direction of detachment (the +z direction) relative to the apparatus body 12.

Next, a description will be given of an opening/closing mechanism for the lid portion 152 of the drainage container 60D relative to the apparatus body 12.

Figure 15C:
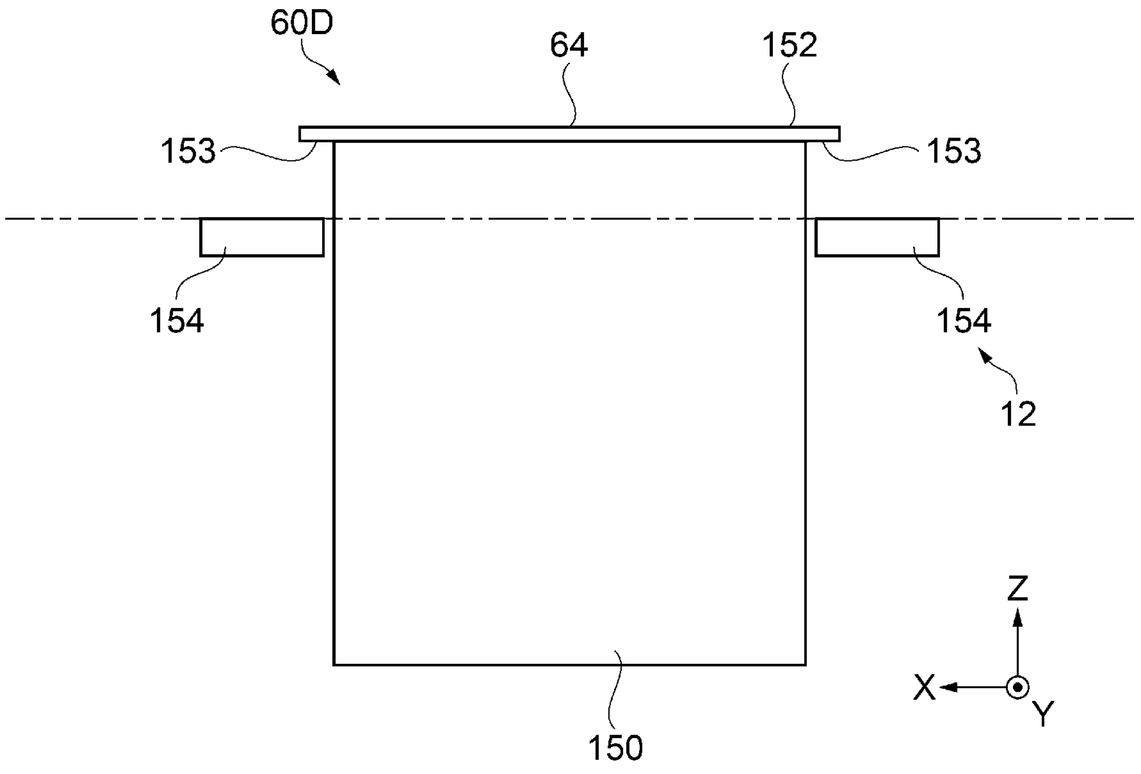
FIG. 15C is still another schematic diagram showing the configuration of the drainage container according to the fifth embodiment.

As shown in FIGS. 15A and 15C, the lid portion 152 includes abutting portions 153. The abutting portions 153 are outer peripheral end portions of the lid portion 152 in plan view, which are eaves portions that protrude from two end portions in the +x direction and the −x direction of the housing 150 in the closed state.

Abutted portions 154 are disposed in the apparatus body 12. The abutted portions 154 are ribs that come into contact with the abutting portions 153 in the attaching operation of the drainage container 60D. The abutted portions 154 are disposed in the −z direction of the abutting portions 153. The abutted portions 154 are arranged in the +x direction and the −x direction of the housing 150 so as to correspond to the positions of the abutting portions 153. In the meantime, since a dimension between the abutted portions 154 is longer than a dimension in the direction along the x axis of the housing 150, the abutted portions 154 come into contact only with the abutting portions 153 without coming into contact with the housing 150 of the drainage container 60D that moves in the attachment/detachment direction.

Figure 15D:
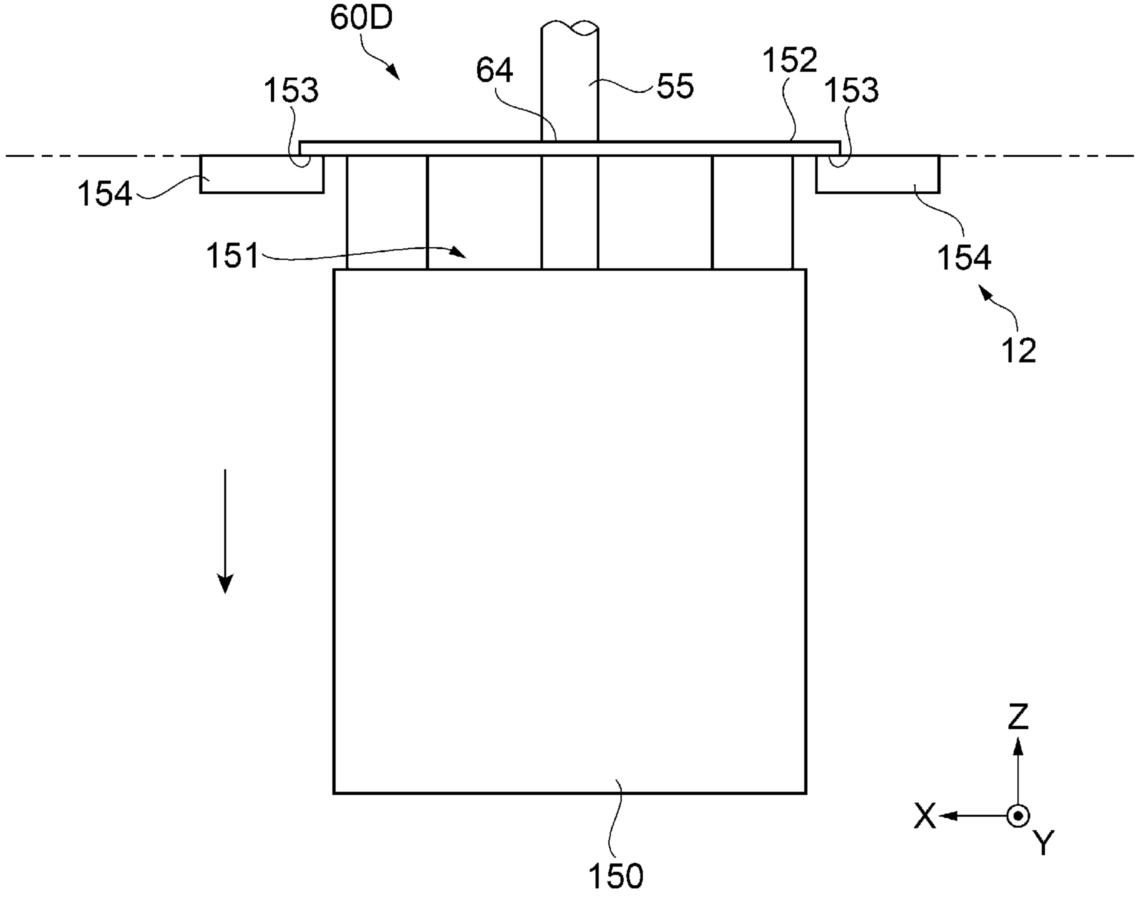
FIG. 15D is yet another schematic diagram showing the configuration of the drainage container according to the fifth embodiment.

As shown in FIGS. 15B and 15D, lower surfaces of the abutting portions 153 abut on upper surfaces of the abutted portions 154 when moving the drainage container 60D in the direction of attachment (the −z direction) so as to attach the drainage container 60D to the apparatus body 12. Then, as a consequence of further moving in the direction of attachment in the state of abutment, the housing 150 moves in the −z direction relative to the lid portion 152 against the biasing force, whereby the lid portion 152 is displaced to the open state. Accordingly, the opening 151 is opened to expose the inside of the housing 150, so that the drying of the drainage stored in the drainage container 60D can be accelerated.

On the other hand, when the drainage container 60D moves in the direction of detachment (the +z direction) as shown in FIGS. 15A and 15C, the lid portion 152 moves in the −z direction due to the biasing force, and the lid portion 152 is displaced to the closed state as the abutting portions 153 are detached from the abutted portions 154. Accordingly, the opening 151 is closed so that the leakage of the drainage from the opening 151 can be suppressed.

Here, the discharge portion 55 is caused to recede from the accepting portion 64 in advance when moving the drainage container 60D in the direction of detachment. The discharge portion 55 is inserted into the housing 150 through the accepting portion 64 when attaching the drainage container 60D.

According to the above-described embodiment, the opening 151 is provided at a different position from the accepting portion 64, so that the large opening 151 can be formed in the state of attachment of the drainage container 60D. This accelerates the drying of the drainage, so that the apparent storage capacity of the drainage in the drainage container 60D can be increased without increasing the size of the drainage container 60D.

6. Sixth Embodiment

Next, a description will be given of a sixth embodiment. Note that the same constituents as those in the first embodiment will be denoted by the same reference signs and overlapping explanations will be omitted.

As with the fifth embodiment, an attachment/detachment direction of a drainage container 60E of this embodiment is the direction along the z axis.

Figure 16A:
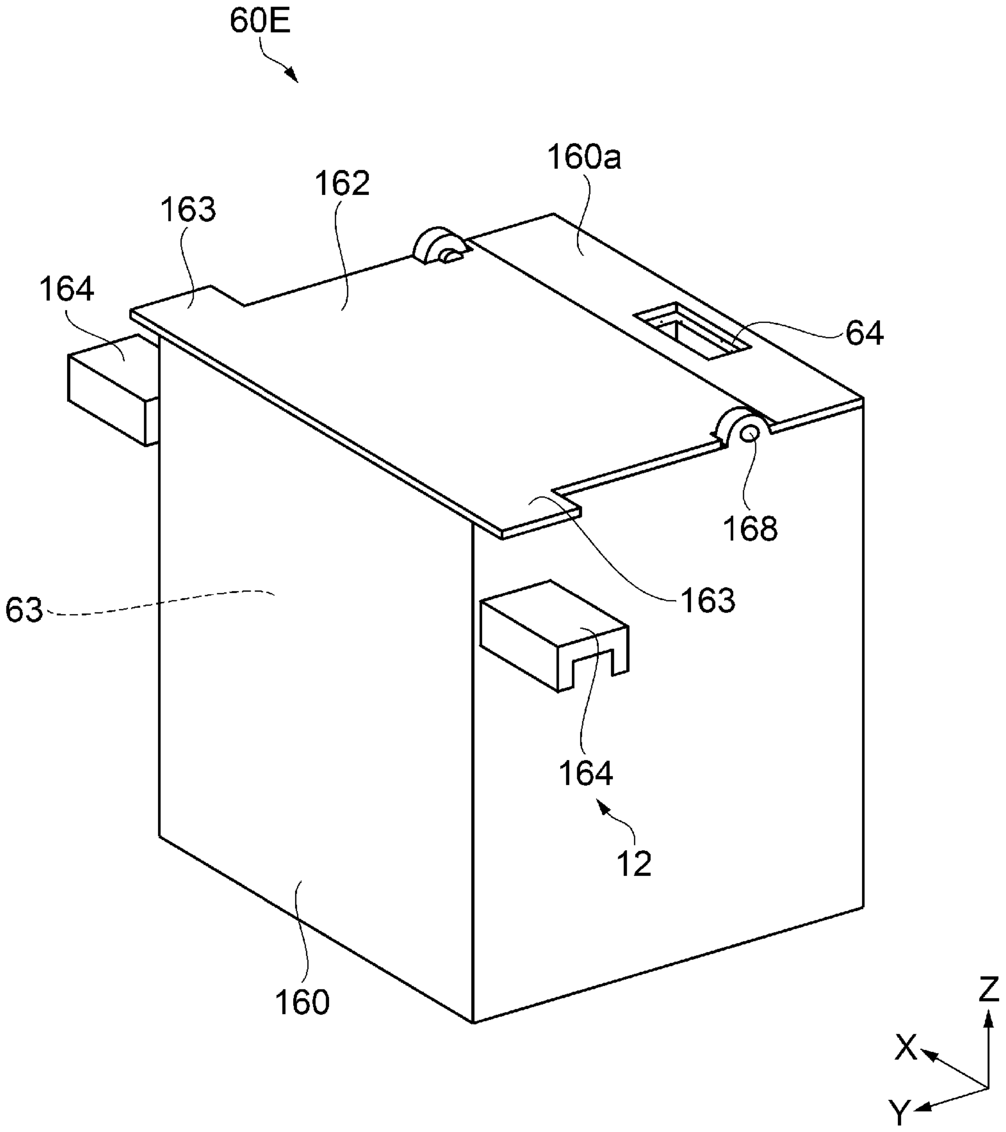
FIG. 16A is a schematic diagram showing a configuration of a drainage container according to a sixth embodiment.
Figure 16B:
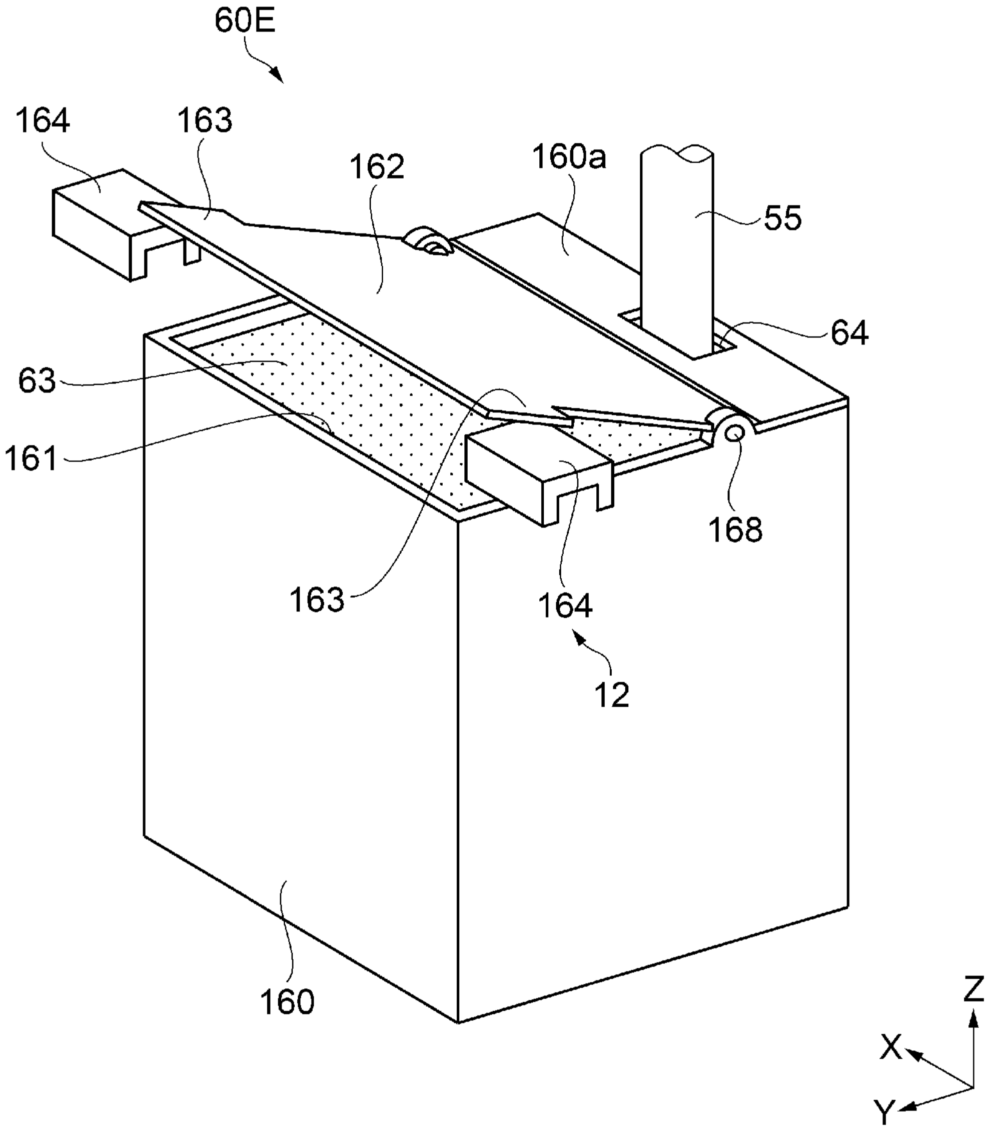
FIG. 16B is another schematic diagram showing the configuration of the drainage container according to the sixth embodiment.

As shown in FIGS. 16A and 16B, the drainage container 60E includes a housing 160 that can store the drainage. The housing 160 is a container having a bottomed box shape, which is provided with an opening 161 at a portion in the +z direction. The absorber 63 is stored in the housing 160.

In the meantime, the drainage container 60E is provided with a lid portion 162 that can open and close the opening 161. The lid portion 162 is a plate member which is larger than the opening 161 in plan view. In the closed state, the lid portion 162 is supported at an end portion in the +z direction of the housing 160.

A rotary shaft 168 that extends in the direction along the x axis is disposed at an end portion in the −y direction of the lid portion 162. The lid portion 162 is turned pivotally around the rotary shaft 168 and can thus be displaced to the closed state and the open state.

The lid portion 162 is biased in the closed state. For example, a twisted portion of a torsion spring serving as the biasing member is fitted into the rotary shaft 168, and one end of the torsion spring is coupled to the lid portion 162 while the other end thereof is coupled to an upper surface portion 160*a* of the housing 160. Since the lid portion 162 is biased in the closed state, it is possible to keep the lid portion 162 from being opened unintentionally when the drainage container 60E is detached from the apparatus body 12. Since the lid portion 162 is closed by use of the biasing force, a driving mechanism for closing the lid portion 162 is not required. Thus, it is possible to construct an opening/closing mechanism for the lid portion 162 with a simple structure.

The upper surface portion 160*a* of the housing 160 disposed in the −y direction of the lid portion 162 is provided with the accepting portion 64 that accepts the drainage discharged from the discharge portion 55. The accepting portion 64 is an opening formed at the upper surface portion 160*a*. The tip end portion of the discharge portion 55 is inserted into the housing 160 through the accepting portion 64.

The lid portion 162 takes on the open state when the drainage container 60E is attached to the apparatus body 12. Accordingly, the absorber 63 in the housing 160 is exposed so that the drying of the drainage in the housing 160 can be accelerated (FIG. 16B).

On the other hand, the lid portion 162 takes on the closed state when the drainage container 60E is detached from the apparatus body 12. In this way, it is possible to suppress the leakage of the drainage in the housing 160 (FIG. 16A).

The lid portion 162 is displaced in accordance with the attachment/detachment direction of the drainage container 60E. Specifically, the lid portion 162 is displaced to the open state when the drainage container 60E moves in the direction of attachment (the −z direction) relative to the apparatus body 12. On the other hand, the lid portion 162 is displaced to the closed state when the drainage container 60E moves in the direction of detachment (the +z direction) relative to the apparatus body 12.

Next, a description will be given of an opening/closing mechanism for the lid portion 162 of the drainage container 60E relative to the apparatus body 12.

The lid portion 162 includes abutting portions 163. The abutting portions 163 are end portions in the +y direction of the lid portion 162, which are eaves portions that protrude from two end portions in the +x direction and the −x direction of the housing 160 in the closed state. The abutting portions 163 are provided on an opposite side of the position where the rotary shaft 168 of the lid portion 162 is provided.

Abutted portions 164 are disposed in the apparatus body 12. The abutted portions 164 are ribs that come into contact with the abutting portions 163 in the attaching operation of the drainage container 60E. The abutted portions 164 are disposed in the −z direction of the abutting portions 163. The abutted portions 164 are arranged in the +x direction and the −x direction of the housing 160 so as to correspond to the positions of the abutting portions 163. In the meantime, since a dimension between the abutted portions 164 is longer than a dimension in the direction along the x axis of the housing 160, the abutted portions 164 come into contact only with the abutting portions 163 without coming into contact with the housing 160 of the drainage container 60E that moves in the attachment/detachment direction.

As shown in FIG. 16B, lower surfaces of the abutting portions 163 abut on upper surfaces of the abutted portions 164 when moving the drainage container 60E in the direction of attachment (the −z direction) so as to attach the drainage container 60E to the apparatus body 12. Then, as a consequence of further moving in the direction of attachment in the state of abutment, the lid portion 162 moves in the clockwise direction around the rotary shaft 168 against the biasing force, whereby the lid portion 162 is relatively displaced to the open state. Accordingly, the opening 161 is opened to expose the inside of the housing 160, so that the drying of the drainage stored in the drainage container 60E can be accelerated.

On the other hand, when the drainage container 60E moves in the direction of detachment (the +z direction) as shown in FIG. 16A, the lid portion 162 moves in the counterclockwise direction around the rotary shaft 168 due to the biasing force, and the lid portion 162 is displaced to the closed state as the abutting portions 163 are detached from the abutted portions 164. Accordingly, the opening 161 is closed so that the leakage of the drainage from the opening 161 can be suppressed.

Here, the discharge portion 55 is caused to recede from the accepting portion 64 in advance when moving the drainage container 60E in the direction of detachment. The discharge portion 55 is inserted into the housing 160 through the accepting portion 64 when attaching the drainage container 60E.

According to the above-described embodiment, the drying of the drainage is accelerated in the state of attachment of the drainage container 60E to the apparatus body 12, so that the apparent storage capacity of the drainage in the drainage container 60E can be increased without increasing the size of the drainage container 60E.

7. Seventh Embodiment

Next, a description will be given of a seventh embodiment. Note that the same constituents as those in the first embodiment will be denoted by the same reference signs and overlapping explanations will be omitted.

As with the fifth embodiment, an attachment/detachment direction of a drainage container 60F of this embodiment is a direction along the z axis.

Figure 17A:
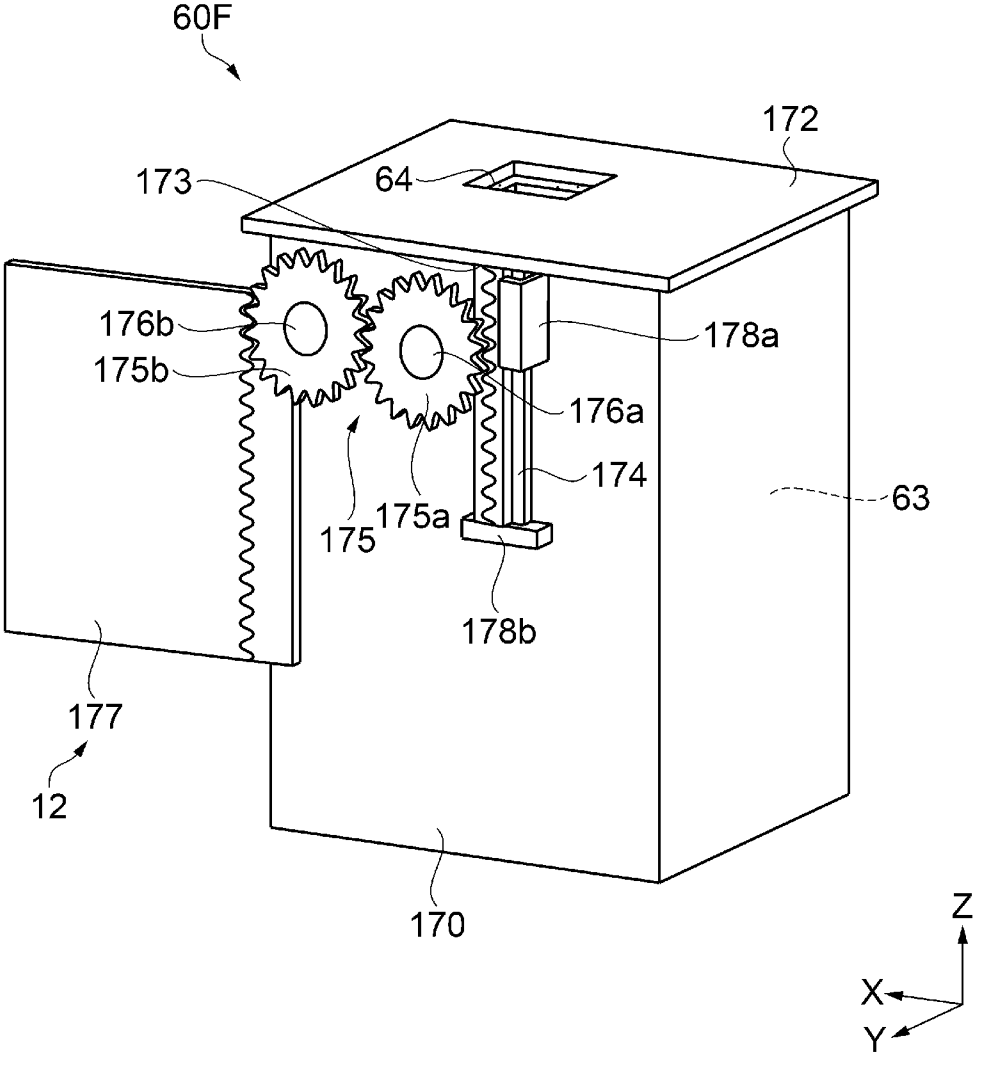
FIG. 17A is a schematic diagram showing a configuration of a drainage container according to a seventh embodiment.
Figure 17B:
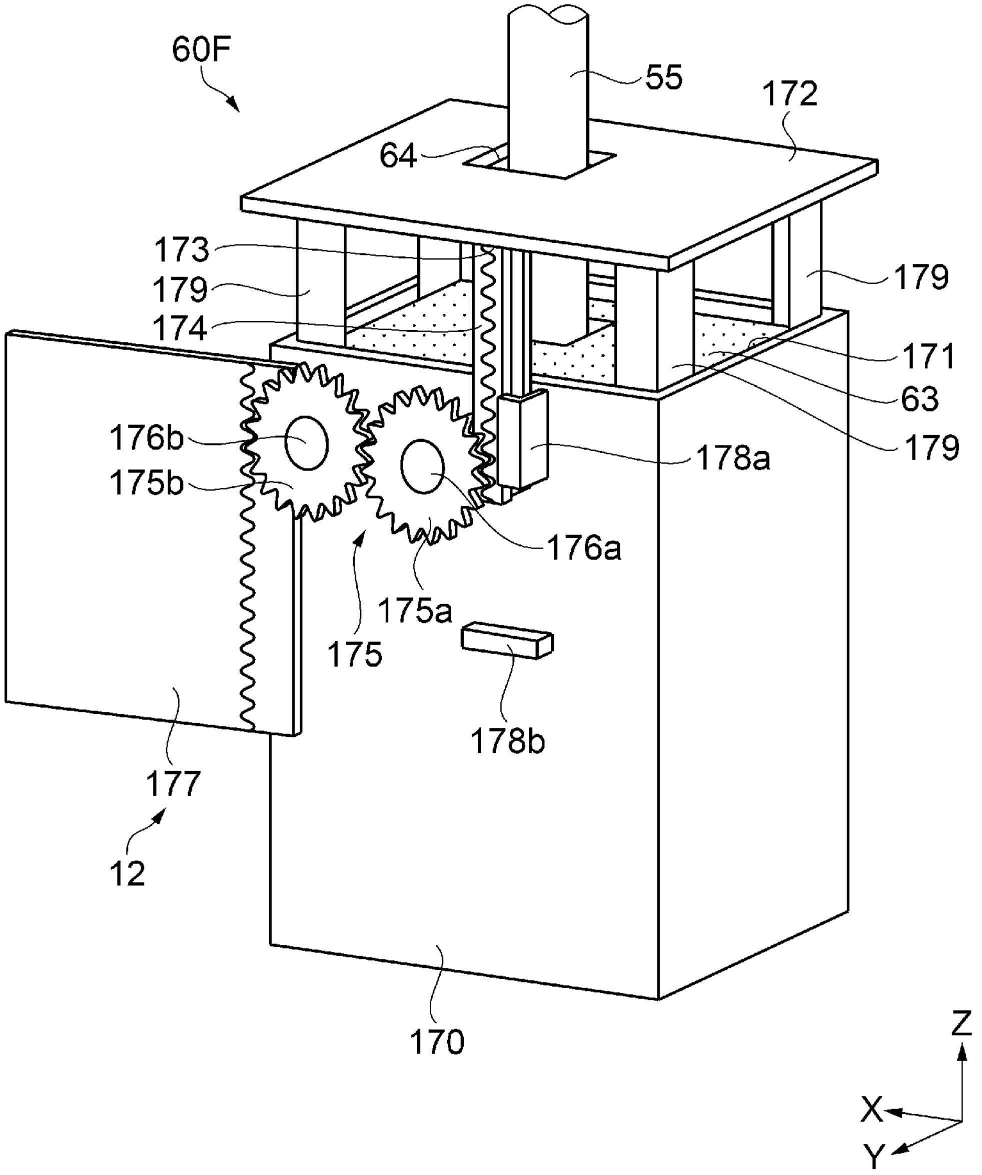
FIG. 17B is another schematic diagram showing the configuration of the drainage container according to the seventh embodiment.

As shown in FIGS. 17A and 17B, the drainage container 60F includes a housing 170 that can store the drainage. The housing 170 is a container having a bottomed box shape, which is provided with an opening 171 that is open in the +z direction. The absorber 63 is stored in the housing 170.

In the meantime, the drainage container 60F is provided with a lid portion 172 that can open and close the opening 171. The lid portion 172 is a plate member which is larger than the opening 171 in plan view. In the closed state, the lid portion 172 is supported at an end portion in the +z direction of the housing 170.

Guide portions 179 formed at four corners of the opening 171 of the housing 170 and configured to guide the lid portion 172 are provided at a lower surface of the lid portion 172. Movement of the guide portions 179 along side walls makes it possible to displace the lid portion 172 smoothly.

The lid portion 172 is provided with the accepting portion 64 that accepts the drainage discharged from the discharge portion 55. The accepting portion 64 is an opening formed at the lid portion 172. The tip end portion of the discharge portion 55 is inserted from the accepting portion 64 into the housing 170.

The lid portion 172 takes on the open state when the drainage container 60F is attached to the apparatus body 12. Accordingly, the absorber 63 in the housing 170 is exposed so that the drying of the drainage in the housing 170 can be accelerated.

On the other hand, the lid portion 172 takes on the closed state when the drainage container 60F is detached from the apparatus body 12. In this way, it is possible to suppress the leakage of the drainage in the housing 170.

The lid portion 172 is displaced in the attachment/detachment direction of the drainage container 60F. Specifically, the lid portion 172 is displaced to the open state when the drainage container 60F moves in the direction of attachment (the −z direction) relative to the apparatus body 12. On the other hand, the lid portion 172 is displaced to the closed state when the drainage container 60F moves in the direction of detachment (the +z direction) relative to the apparatus body 12.

Next, a description will be given of an opening/closing mechanism for the lid portion 172 of the drainage container 60F relative to the apparatus body 12. To be more precise, the opening/closing mechanism for the lid portion 172 of the drainage container 60F is formed from a rack and pinion mechanism.

The lid portion 172 includes an abutting portion 173. The abutting portion 173 is an outer peripheral end portion of the lid portion 172 in plan view, which is an eaves portion that protrudes in the +y direction from the housing 170 in the closed state.

The drainage container 60F includes a first rack 174 that can come into contact with the lid portion 172, and a gear unit 175 threadedly engaged with the first rack 174.

The first rack 174 is a rod member provided with threads. The first rack 174 is disposed extending in the direction along the z axis. To be more precise, an end portion in the +z direction of the first rack 174 is disposed so as to be capable of coming into contact with the abutting portion 173 of the lid portion 172. The first rack 174 is configured to be movable in the direction along the z axis. There is provided a guide plate 178*a* to guide the first rack 174 in a direction of movement of the first rack 174. There is also provided a support portion 178*b* that supports the first rack 174 from below at a bottom dead point in the direction of movement along the −z direction of the first rack 174. This configuration reliably conducts the movement of the first rack 174 in the direction along the z axis.

The gear unit 175 includes a first gear 175*a* and a second gear 175*b*. The first gear 175*a* and the second gear 175*b* are rotated around spindles 176*a* and 176*b*, respectively. The first gear 175*a* is located in the +x direction of the first rack 174 and is threadedly engaged with the first rack 174. The second gear 175*b* is located in the +x direction of the first gear 175*a* and is threadedly engaged with the first gear 175*a*.

The apparatus body 12 includes a second rack 177 to be threadedly engaged with the gear unit 175. To be more precise, the second rack 177 is located in the +x direction from the second gear 175*b* and is to be threadedly engaged with the second gear 175*b*. The second rack 177 is a plate member provided with threads. The second rack 177 is fixedly located in a direction along the z axis.

When the drainage container 60F is attached to the apparatus body 12, the drainage container 60F is caused to move in the direction of attachment (the −z direction) while bringing the second rack 177 into threaded engagement with the second gear 175*b*. Accordingly, the second gear 175*b* is rotated in the clockwise direction around the spindle 176*b*. The first gear 175*a* threadedly engaged with the second gear 175*b* is rotated in the counterclockwise direction around the spindle 176*a*. The first rack 174 threadedly engaged with the first gear 175*a* moves in the +z direction. As a consequence, an end portion in the +z direction of the first rack 174 comes into contact with the abutting portion 173 to push the lid portion 172 upward relative to the housing 170, whereby the lid portion 172 is displaced to the open state. Accordingly, the opening 171 is opened to expose the inside of the housing 170, so that the drying of the drainage stored in the drainage container 60F can be accelerated.

On the other hand, when the drainage container 60F is caused to move in the direction of detachment (the +z direction), the second gear 175*b* is rotated in the counterclockwise direction around the spindle 176*b*. The first gear 175*a* is rotated in the clockwise direction around the spindle 176*a*. The first rack 174 moves in the −z direction due to biasing force or gravitational force, whereby the lid portion 172 is displaced to the closed state. Accordingly, the opening 171 is blocked so that the leakage of the drainage can be suppressed.

Here, the biasing force can be brought about by using a biasing member. To be more precise, the drainage container 60F includes a biasing member and the lid portion 172 is kept at the closed state by biasing force of the biasing member. For example, one end of a coil spring serving as the biasing member is coupled to an end portion in the +z direction of the housing 170, and the other end thereof is coupled to the lid portion 172. The coil spring is in a contracted state when the lid portion 172 is in the closed state, and the coil spring is in a stretched state when the lid portion 172 is in the open state. Accordingly, since the lid portion 172 is biased in the closed state, it is possible to keep the lid portion 172 from being opened unintentionally when the drainage container 60F is detached from the apparatus body 12.

Here, the discharge portion 55 is caused to recede from the accepting portion 64 in advance when moving the drainage container 60F in the direction of detachment. The discharge portion 55 is inserted into the housing 170 through the accepting portion 64 when attaching the drainage container 60F.

According to the above-described embodiment, the lid portion 172 is opened by using the rack and pinion mechanism in the process of attaching the drainage container 60F. Thus, the opening/closing mechanism for the lid portion 172 can be realized with the simple structure without requiring a driving source for opening the lid portion 172.

Here, the above-described rack and pinion mechanism may also be provided on the −y direction side of the housing 170 in addition to the +y direction side of the housing 170. In this way, it is possible to carry out the opening and closing operations of the lid portion 172 more smoothly.

Note that the number of gears constituting the gear unit 175 may be determined at discretion within a range in conformity to the direction of displacement of the first rack 174.

The first rack 174 may be fixed to an end surface in the −z direction of the lid portion 172. This configuration does not require the support portion 178*b*.

8. Eighth Embodiment

Next, a description will be given of an eighth embodiment. Note that the same constituents as those in the first embodiment will be denoted by the same reference signs and overlapping explanations will be omitted.

In the fifth embodiment, the direction of attachment of the drainage container 60D is the −z direction while the direction of detachment thereof is the +z direction. However, the attachment/detachment direction is not limited to the foregoing. A direction of attachment of a drainage container 60G of this embodiment is the +z direction while a direction of detachment thereof is the −z direction.

Now, a specific configuration of the embodiment will be described below.

Figure 18A:
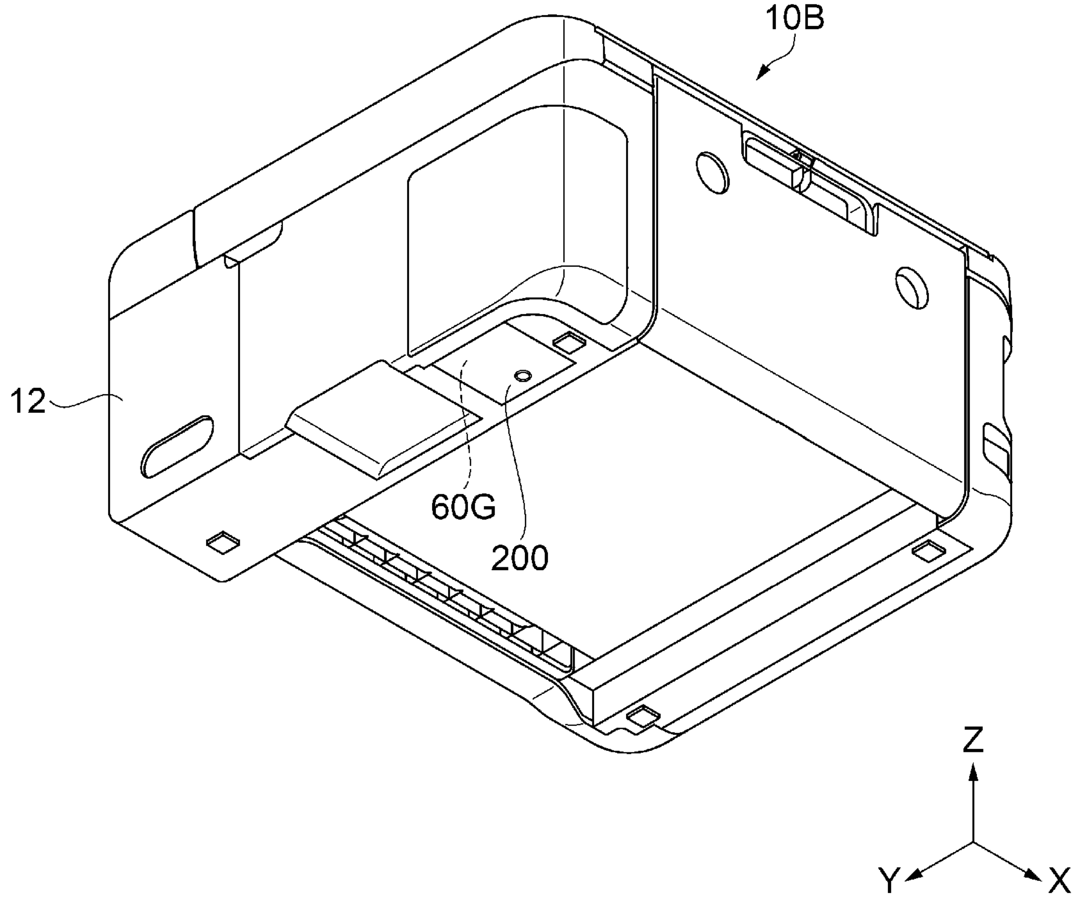
FIG. 18A is a perspective view showing a configuration of a recording apparatus according to an eighth embodiment.

FIG. 18A is a perspective view showing a configuration of a recording apparatus 10B of this embodiment. The drainage container 60G of this embodiment is provided at an end portion in the −y direction inside the apparatus body 12 and at an end portion in the −x direction.

When the drainage container 60G is attached to and detached from the apparatus body 12, a bottom face cover 200 attached to a bottom surface of the apparatus body 12 is displaced to the open state.

Figure 18B:
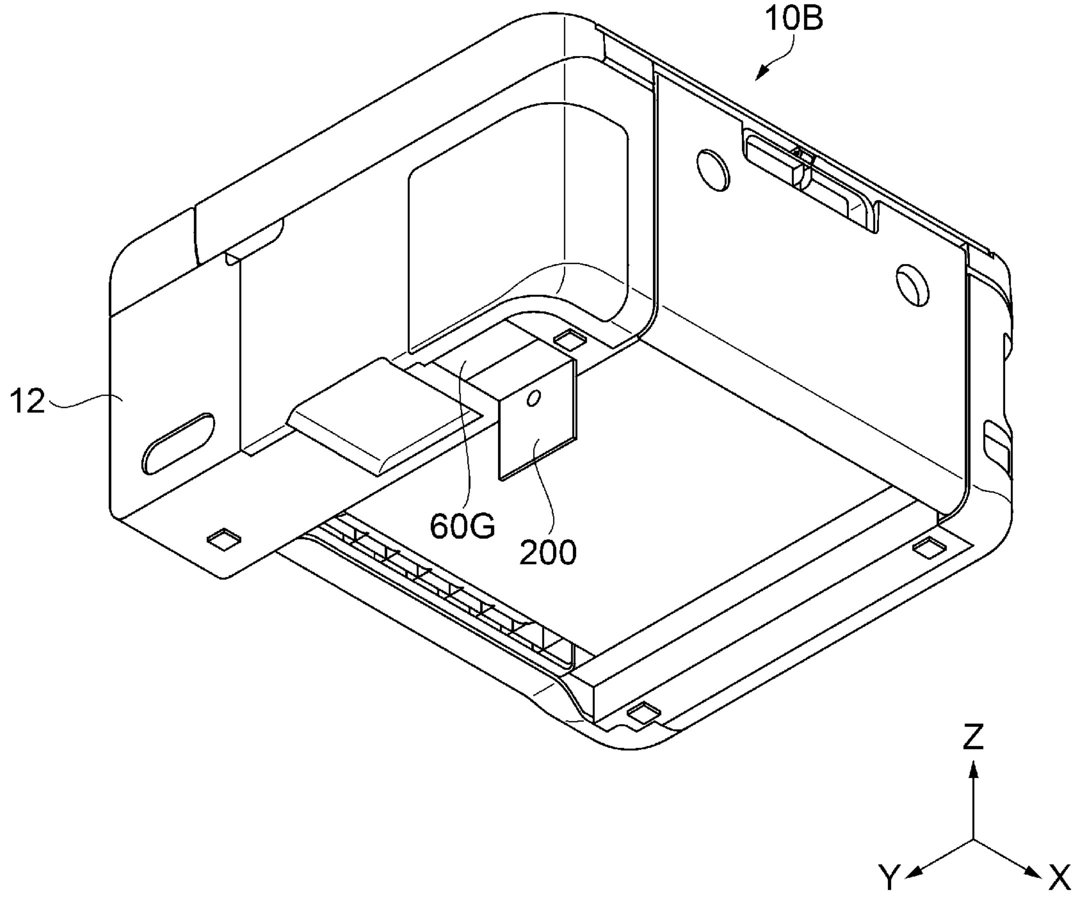
FIG. 18B is another perspective view showing the configuration of the recording apparatus according to the eighth embodiment.
Figure 18C:
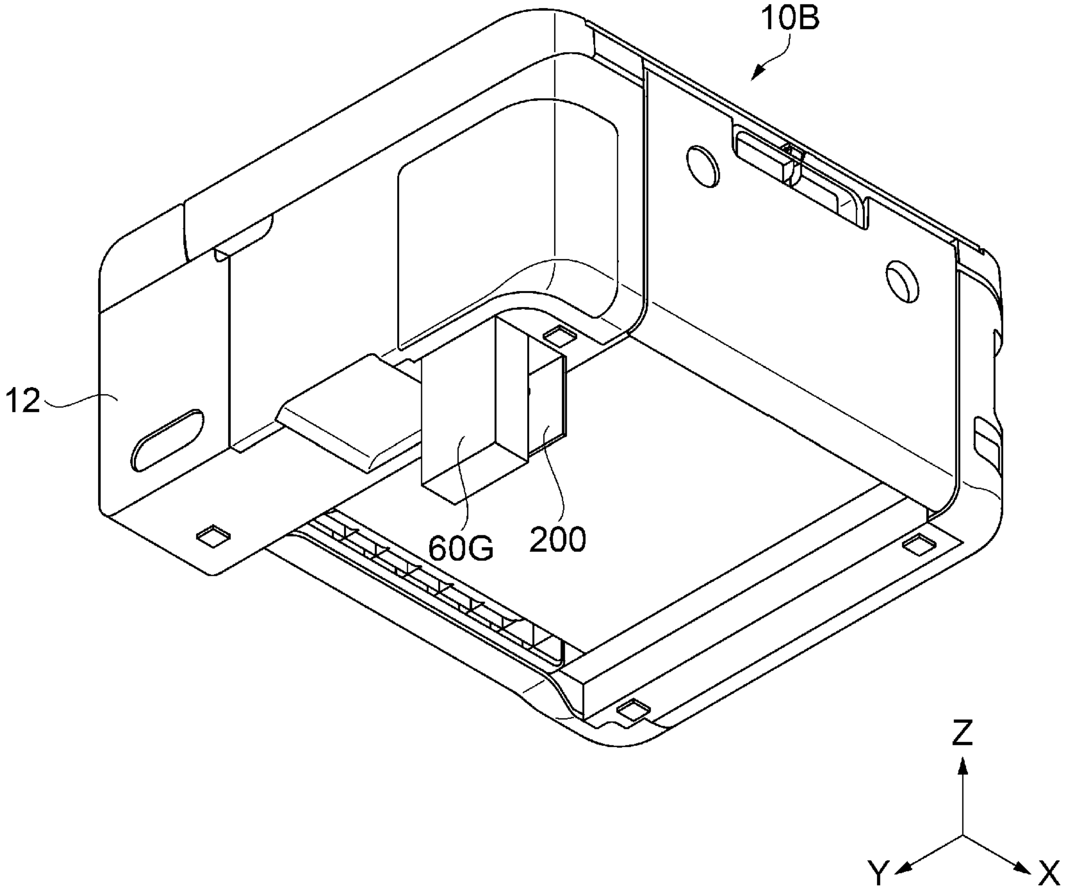
FIG. 18C is still another perspective view showing the configuration of the recording apparatus according to the eighth embodiment.

In this way, the drainage container 60G is exposed as shown in FIG. 18B so that the drainage container 60G is accessible. As shown in FIG. 18C, the drainage container 60G can be detached from the apparatus body 12 by pulling the drainage container 60G downward which is attached to the inside of the apparatus body 12. The drainage container 60G can be attached to the apparatus body 12 by inserting the drainage container 60G upward.

Figure 19A:
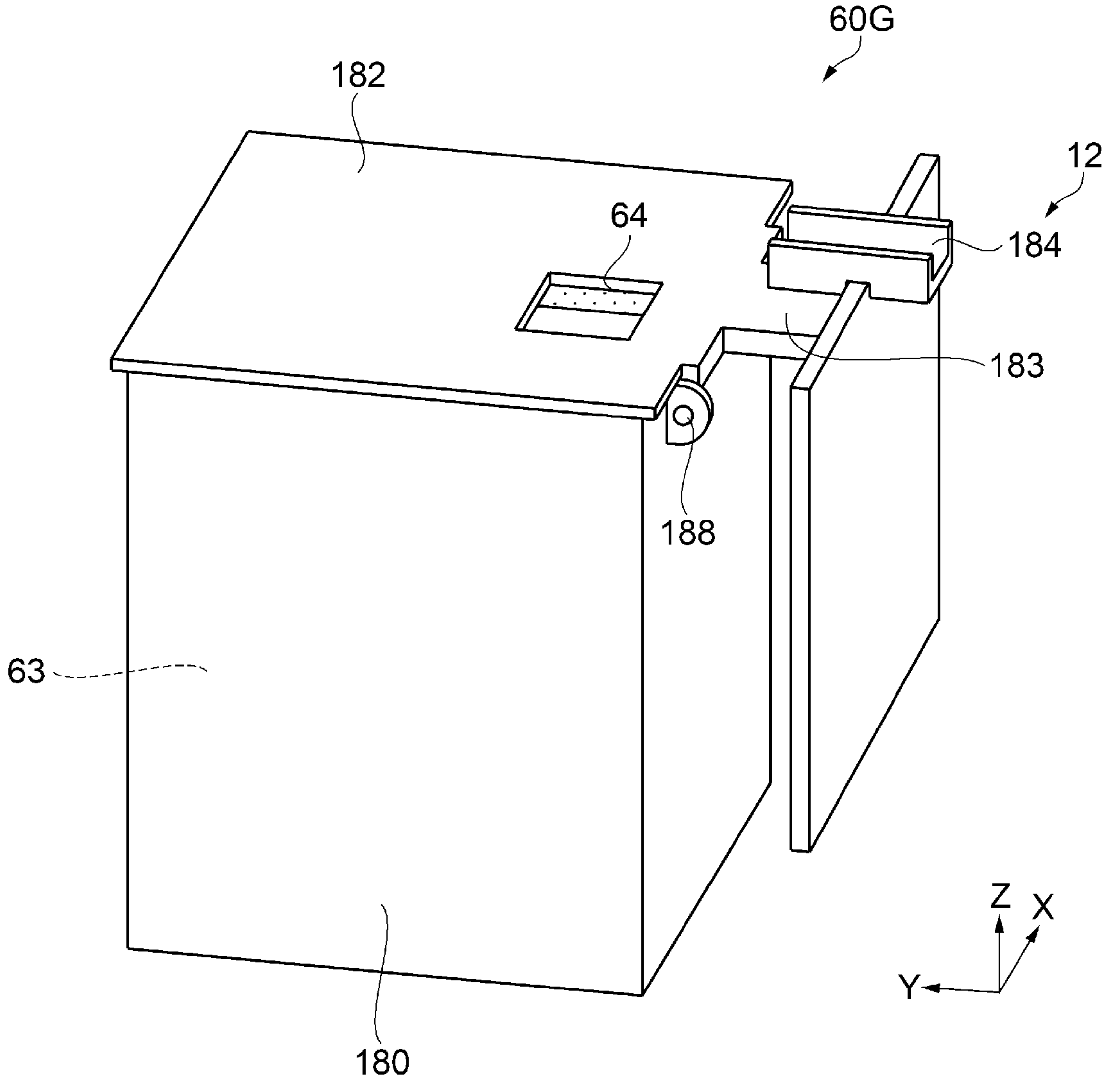
FIG. 19A is a schematic diagram showing a configuration of a drainage container according to the eighth embodiment.
Figure 19B:
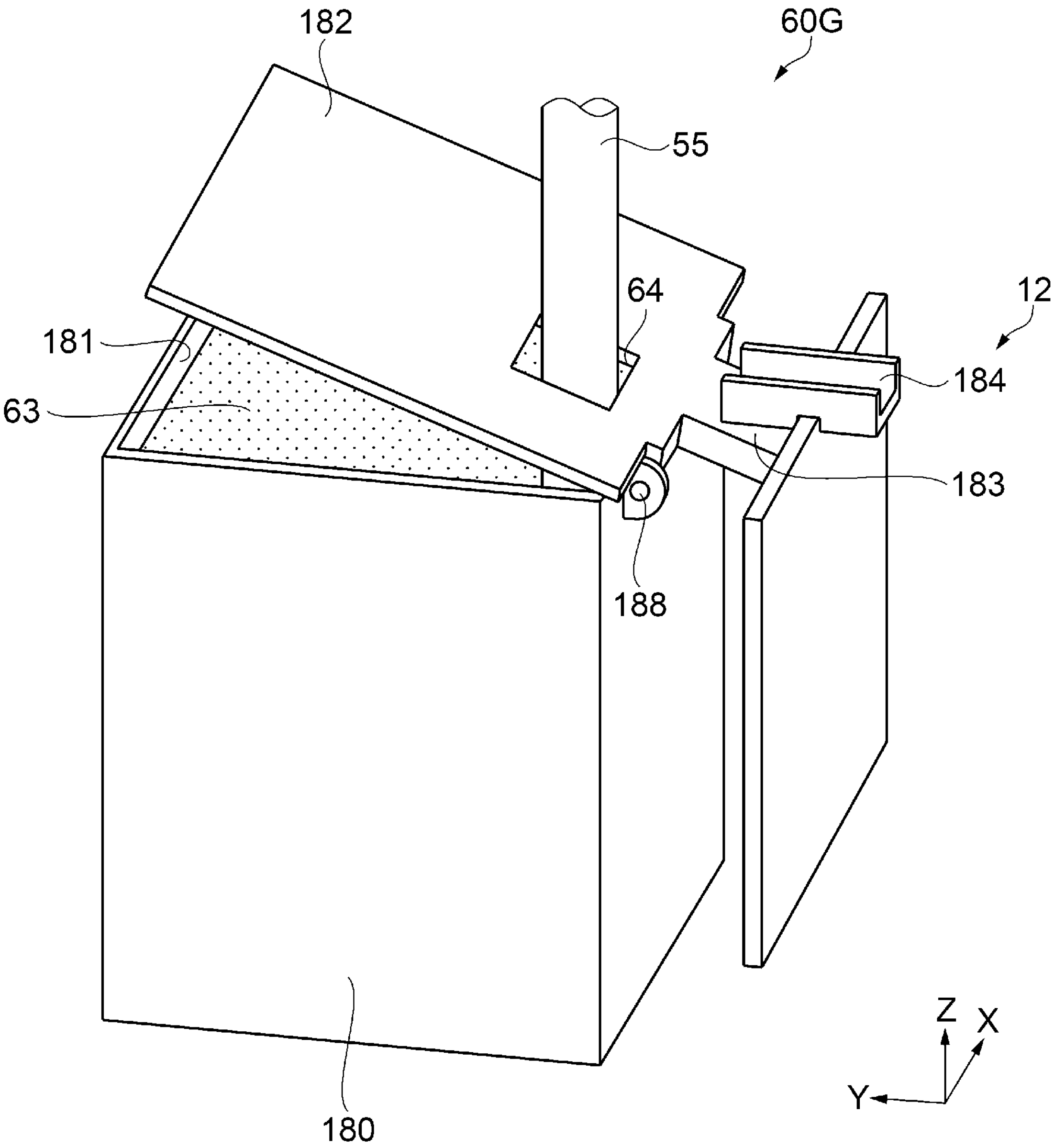
FIG. 19B is another schematic diagram showing the configuration of the drainage container according to the eighth embodiment.

As shown in FIGS. 19A and 19B, the drainage container 60G includes a housing 180 that can store the drainage. The housing 180 is a container having a bottomed box shape, which is provided with an opening 181 that is open in the +z direction. The absorber 63 is stored in the housing 180.

The drainage container 60G is provided with a lid portion 182 that can open and close the opening 181. The lid portion 182 is a plate member which is larger than the opening 181 in plan view. In the closed state, the lid portion 182 is supported at an end portion in the +z direction of the housing 180.

A rotary shaft 188 that extends in the direction along the x axis is disposed at an end portion in the −y direction of the lid portion 182. The lid portion 182 is turned pivotally around the rotary shaft 188 and can thus be displaced to the closed state and the open state.

The lid portion 182 is biased in the closed state. For example, a twisted portion of a torsion spring serving as the biasing member is fitted into the rotary shaft 188, and one end of the torsion spring is coupled to the lid portion 182 while the other end thereof is coupled to an upper surface portion of the housing 180. Since the lid portion 182 is biased in the closed state, it is possible to keep the lid portion 182 from being opened unintentionally when the drainage container 60G is detached from the apparatus body 12. Since the lid portion 182 is closed by use of the biasing force, a driving mechanism for closing the lid portion 182 is not required. Thus, it is possible to construct an opening/closing mechanism for the lid portion 182 with a simple structure.

The lid portion 182 is provided with the accepting portion 64 that accepts the drainage discharged from the discharge portion 55. The accepting portion 64 is an opening formed at the lid portion 182. The tip end portion of the discharge portion 55 is inserted into the housing 180 through the accepting portion 64.

The lid portion 182 takes on the open state when the drainage container 60G is attached to the apparatus body 12. Accordingly, the absorber 63 in the housing 180 is exposed so that the drying of the drainage in the housing 180 can be accelerated (FIG. 19B).

On the other hand, the lid portion 182 takes on the closed state when the drainage container 60G is detached from the apparatus body 12. In this way, it is possible to suppress the leakage of the drainage in the housing 180 (FIG. 19A).

The lid portion 182 is displaced in accordance with the attachment/detachment direction of the drainage container 60G. Specifically, the lid portion 182 is displaced to the open state when the drainage container 60G moves in the direction of attachment (the +z direction) relative to the apparatus body 12. On the other hand, the lid portion 182 is displaced to the closed state when the drainage container 60G moves in the direction of detachment (the −z direction) relative to the apparatus body 12.

Next, a description will be given of an opening/closing mechanism for the lid portion 182 of the drainage container 60G relative to the apparatus body 12.

The lid portion 182 includes an abutting portion 183. The abutting portion 183 is an end portion in the −y direction of the lid portion 182, which is an eaves portion that protrudes in the −y direction from an end portion of the housing 180 in the closed state. The abutting portion 183 is located on the −y direction side of the position where the rotary shaft 188 is provided.

An abutted portion 184 is disposed in the apparatus body 12. The abutted portion 184 is a rib that comes into contact with the abutting portion 183 in the attaching operation of the drainage container 60G. The abutted portion 184 is disposed in the +z direction of the abutting portion 183. The abutted portion 184 is located in the −y direction of the rotary shaft 188 in plan view. Accordingly, the abutted portion 184 comes into contact only with the abutting portion 183.

As shown in FIG. 19B, an upper surface of the abutting portion 183 abuts on a lower surface of the abutted portion 184 when moving the drainage container 60G in the direction of attachment (the +z direction) so as to attach the drainage container 60G to the apparatus body 12. Then, as a consequence of further moving in the direction of attachment in the state of abutment, the lid portion 182 moves in the clockwise direction around the rotary shaft 188 against the biasing force, whereby the lid portion 182 is relatively displaced to the open state relative to the housing 180. Hence, the drainage container 60G is attached to the apparatus body 12. Accordingly, the opening 181 is opened to expose the inside of the housing 180, so that the drying of the drainage stored in the drainage container 60G can be accelerated.

On the other hand, when the drainage container 60G moves in the direction of detachment (the −z direction) as shown in FIG. 19A, the lid portion 182 moves in the counterclockwise direction around the rotary shaft 188 due to the biasing force, and the lid portion 182 is displaced to the closed state as the abutting portion 183 is detached from the abutted portion 184. Since the drainage container 60G is detached from the apparatus body 12 in the blocked state of the opening 181, the leakage of the drainage from the opening 181 can be suppressed.

Here, the discharge portion 55 is caused to recede from the accepting portion 64 in advance when moving the drainage container 60G in the direction of detachment. The accepting portion 64 is attached to the discharge portion 55 when attaching the drainage container 60G.

According to the above-described embodiment, the drying of the drainage is accelerated in the state of attaching the drainage container 60G to the apparatus body 12. Thus, the apparent storage capacity of the drainage in the drainage container 60G can be increased without increasing the size of the drainage container 60G.

9. Ninth Embodiment

Next, a description will be given of a ninth embodiment. Note that the same constituents as those in the first embodiment will be denoted by the same reference signs and overlapping explanations will be omitted.

As with the eighth embodiment, a direction of attachment of a drainage container 60H of this embodiment is the +z direction while a direction of detachment thereof is the −z direction.

Figure 20A:
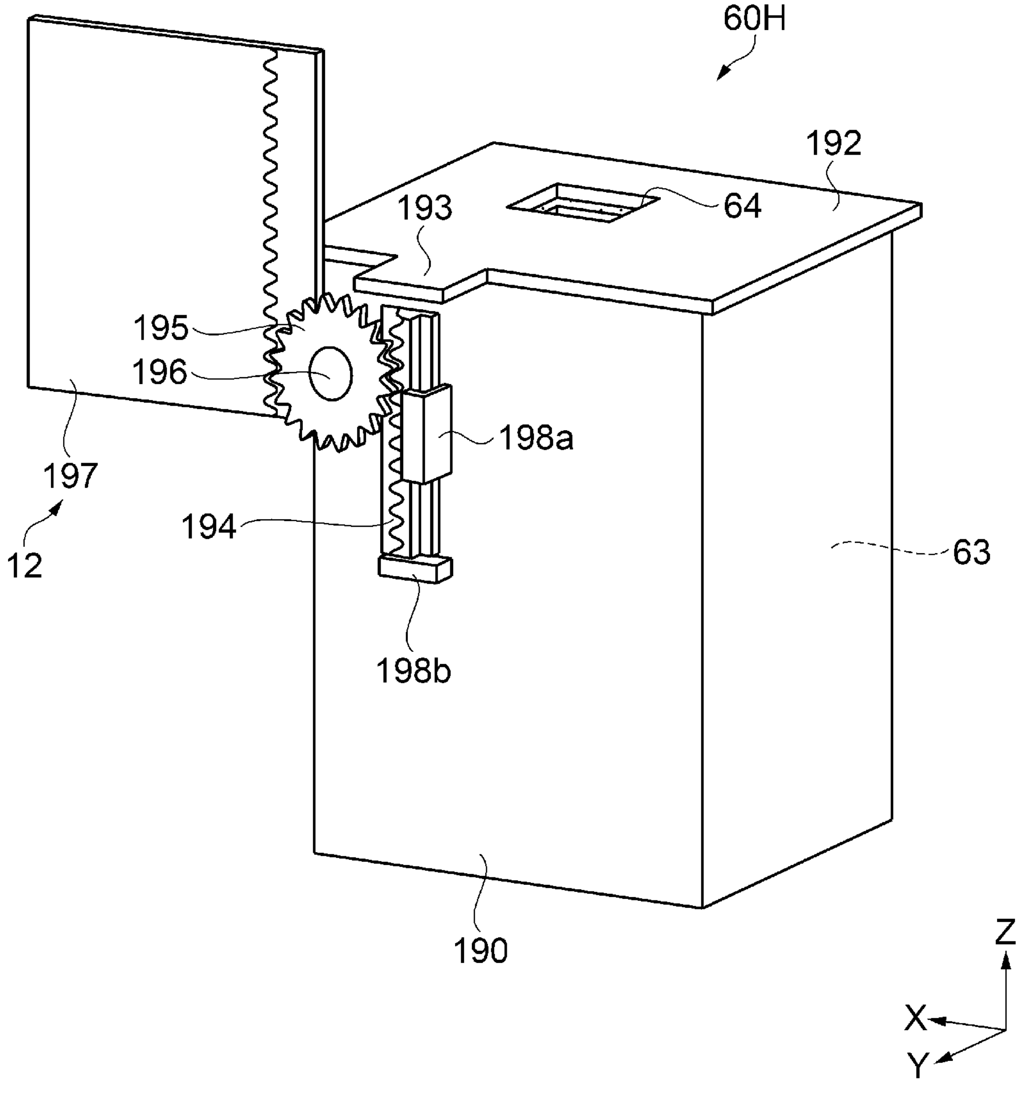
FIG. 20A is a schematic diagram showing a configuration of a drainage container according to a ninth embodiment.
Figure 20B:
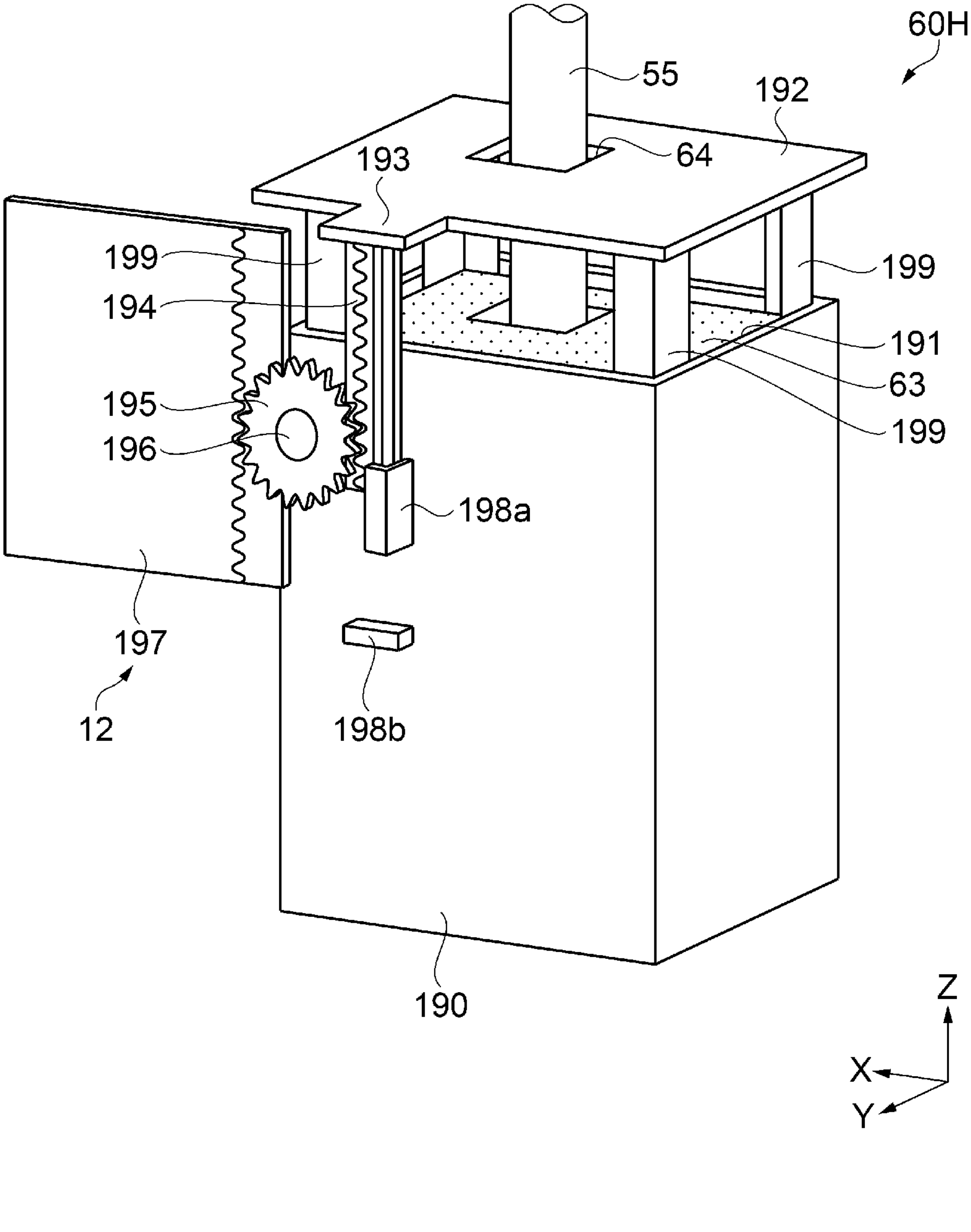
FIG. 20B is another schematic diagram showing the configuration of the drainage container according to the ninth embodiment.

As shown in FIGS. 20A and 20B, the drainage container 60H includes a housing 190 that can store the drainage. The housing 190 is a container having a bottomed box shape, which is provided with an opening 191 that is open in the +z direction. The absorber 63 is stored in the housing 190.

The drainage container 60H is provided with a lid portion 192 that can open and close the opening 191. The lid portion 192 is a plate member which is larger than the opening 191 in plan view. In the closed state, the lid portion 192 is supported at an end portion in the +z direction of the housing 190.

Guide portions 199 formed at four corners of the opening 191 of the housing 190 and configured to guide the lid portion 192 are provided at a lower surface of the lid portion 192. Movement of the guide portions 199 along side walls makes it possible to displace the lid portion 192 smoothly.

The lid portion 192 is provided with the accepting portion 64 that accepts the drainage discharged from the discharge portion 55. The accepting portion 64 is an opening formed at the lid portion 192. The tip end portion of the discharge portion 55 is inserted into the housing 190 through the accepting portion 64.

The lid portion 192 takes on the open state when the drainage container 60H is attached to the apparatus body 12. Accordingly, the absorber 63 in the housing 190 is exposed so that the drying of the drainage in the housing 190 can be accelerated.

On the other hand, the lid portion 192 takes on the closed state when the drainage container 60H is detached from the apparatus body 12. In this way, it is possible to suppress the leakage of the drainage in the housing 190.

The lid portion 192 is displaced in the attachment/detachment direction of the drainage container 60H. Specifically, the lid portion 192 is displaced to the open state when the drainage container 60H moves in the direction of attachment (the +z direction) relative to the apparatus body 12. On the other hand, the lid portion 192 is displaced to the closed state when the drainage container 60H moves in the direction of detachment (the −z direction) relative to the apparatus body 12.

Next, a description will be given of an opening/closing mechanism for the lid portion 192 of the drainage container 60H relative to the apparatus body 12. To be more precise, the opening/closing mechanism for the lid portion 192 of the drainage container 60H is formed from a rack and pinion mechanism.

The lid portion 192 includes an abutting portion 193. The abutting portion 193 is an outer peripheral end portion of the lid portion 192 in plan view, which is an eaves portion that protrudes in the +y direction from the housing 190 in the closed state.

The drainage container 60H includes a first rack 194 that can come into contact with the lid portion 192, and a gear 195 serving as a gear unit threadedly engaged with the first rack 194.

The first rack 194 is a rod member provided with threads. The first rack 194 is disposed extending in the direction along the z axis. To be more precise, an end portion in the +z direction of the first rack 194 is disposed so as to be capable of coming into contact with the abutting portion 193 of the lid portion 192. The first rack 194 is configured to be movable in the direction along the z axis. There is provided a guide plate 198*a* to guide the first rack 194 in the direction of movement of the first rack 194. There is also provided a support portion 198*b* that supports the first rack 194 from below at a bottom dead point in the direction of movement along the −z direction of the first rack 194. This configuration reliably conducts the movement of the first rack 194 in the direction along the z axis.

The gear 195 is threadedly engaged with the first rack 194. The gear 195 is disposed in the +x direction of the first rack 194. The gear 195 is rotated around a spindle 196.

The apparatus body 12 includes a second rack 197 to be threadedly engaged with the gear 195. The second rack 197 is a plate member provided with threads. The second rack 197 is disposed in the +x direction of the gear 195. The second rack 197 is fixedly located in the direction along the z axis.

When the drainage container 60H is attached to the apparatus body 12, the drainage container 60H is caused to move in the direction of attachment (the +z direction) while bringing the second rack 197 into threaded engagement with the gear 195. Accordingly, the gear 195 is rotated in the counterclockwise direction around the spindle 196. The first rack 194 threadedly engaged with the gear 195 moves in the +z direction. As a consequence, an end portion in the +z direction of the first rack 194 comes into contact with the abutting portion 193 to push the lid portion 192 upward relative to the housing 190, whereby the lid portion 192 is displaced to the open state (FIG. 20B). Accordingly, the opening 191 is opened to expose the inside of the housing 190, so that the drying of the drainage stored in the drainage container 60H can be accelerated.

On the other hand, when the drainage container 60H is caused to move in the direction of detachment (the −z direction), the gear 195 is rotated in the clockwise direction around the spindle 196. Then, the first rack 194 moves in the −z direction due to biasing force or the gravitational force, whereby the lid portion 192 is displaced to the closed state (FIG. 20A). In this way, the opening 191 is closed so that the leakage of the drainage can be suppressed.

Here, the biasing force can be brought about by using a biasing member. To be more precise, the drainage container 60H includes a biasing member and the lid portion 192 is kept at the closed state by biasing force of the biasing member. For example, one end of a coil spring serving as the biasing member is coupled to an end portion in the +z direction of the housing 190, and the other end thereof is coupled to the lid portion 192. The coil spring is in a contracted state when the lid portion 192 is in the closed state, and the coil spring is in a stretched state when the lid portion 192 is in the open state. Accordingly, since the lid portion 192 is biased in the closed state, it is possible to keep the lid portion 192 from being opened unintentionally when the drainage container 60H is detached from the apparatus body 12.

Here, the discharge portion 55 is caused to recede from the accepting portion 64 in advance when moving the drainage container 60H in the direction of detachment. The discharge portion 55 is attached to the accepting portion 64 when attaching the drainage container 60H.

According to the above-described embodiment, the lid portion 192 is opened by using the rack and pinion mechanism in the process of attaching the drainage container 60H. Thus, the opening/closing mechanism for the lid portion 192 can be realized with the simple structure without requiring a driving source for opening the lid portion 192.

Here, the above-described rack and pinion mechanism may also be provided on the −y direction side of the housing 190 in addition to the +y direction side of the housing 190. In this way, it is possible to carry out the opening and closing operations of the lid portion 192 more smoothly.

Note that the number of gears constituting the gear unit may be determined at discretion within a range in conformity to the direction of displacement of the first rack 194.

The first rack 194 may be fixed to an end surface in the −z direction of the lid portion 192. This configuration does not require the support portion 198*b*.

Here, two or more of the first embodiment to the ninth embodiment described above may be combined when appropriate.

What is claimed is:

1. A drainage container configured to be attached and detached in an attachment/detachment direction to and from an apparatus including a discharge portion to discharge drainage and configured to store the drainage discharged from the discharge portion, the drainage container comprising:
- a housing that stores the drainage, wherein an opening is formed in the housing;
- an accepting portion that accepts the drainage discharged from the discharge portion; and
- a lid portion configured to open and close the opening, wherein
- the lid portion is positioned in an open state to open the opening when the drainage container is attached to the apparatus, and
- the lid portion is positioned in a closed state to close the opening when the drainage container is detached from the apparatus.

2. The drainage container according to claim 1, wherein the lid portion is biased to the closed state.

3. The drainage container according to claim 1, wherein the lid portion is displaced along an upper surface of the housing.

4. The drainage container according to claim 1, wherein the lid portion is displaced in the attachment/detachment direction of the drainage container.

5. The drainage container according to claim 1, wherein the lid portion is displaced by being turned around a rotary shaft.

6. The drainage container according to claim 1, wherein
- a plurality of openings are formed in an upper surface of the housing, and
- slits are formed in respective regions of the lid portion which correspond to the plurality of openings in the open state.

7. The drainage container according to claim 1, further comprising:
- an absorber provided inside the housing and configured to absorb the drainage.

8. The drainage container according to claim 1, wherein the lid portion is displaced within a region of an upper surface of the housing in a top view in the open state.

9. The drainage container according to claim 1, wherein the accepting portion is provided in a first surface of the housing.

10. The drainage container according to claim 9, wherein a gripping portion used to grip the housing is provided at a second surface, the second surface being an opposite surface of the first surface.

11. The drainage container according to claim 10, wherein the first surface and the second surface are surfaces intersecting with the attachment/detachment direction.

12. A recording apparatus comprising:
- an apparatus body;
- a recording head that performs recording by ejecting a liquid to a medium;
- a discharge portion that discharges drainage from inside the apparatus body; and
- the drainage container according to claim 1.

13. The recording apparatus according to claim 12, wherein
- the lid portion includes an abutting portion,
- the apparatus body includes an abutted portion that the abutting portion abuts on, and
- the lid portion is displaced to the open state by the abutting portion abutting on the abutted portion when the drainage container is attached to the apparatus body.

14. The recording apparatus according to claim 13, wherein
- the apparatus body includes a cover which is displaced to the open state when the drainage container is attached to and detached from the apparatus body.

15. The recording apparatus according to claim 12, wherein
- the drainage container includes
- a first rack configured to come into contact with the lid portion, and
- a gear unit threadedly engaged with the first rack, and
- the apparatus body includes a second rack threadedly engaged with the gear unit.

16. The recording apparatus according to claim 12, wherein the drainage container stores, as the drainage, the liquid ejected from the recording head to outside of an end portion of the medium at a time of the recording by the recording head.

17. The recording apparatus according to claim 12, further comprising:
- a maintenance unit that performs cleaning of the recording head by forcibly causing the recording head to discharge the liquid, wherein
- the drainage container stores, as the drainage, the liquid discharged at time of the cleaning by the maintenance unit.

18. The recording apparatus according to claim 12, wherein the drainage container stores, as the drainage, the liquid ejected from the recording head.

19. A recording apparatus comprising:
- an apparatus body;
- a recording head that performs recording by ejecting a liquid to a medium;
- a discharge portion that discharges drainage that comes into being inside the apparatus body; and
- an attached portion where a drainage container is attached and detached, wherein
- the apparatus body includes an abutted portion that an abutting portion included in a lid portion of the drainage container abuts on.

20. The recording apparatus according to claim 19, wherein the apparatus body includes a cover which is displaced to the open state when the drainage container is attached to and detached from the apparatus body.

* * * * *